US011972546B2

(12) United States Patent
Kobayashi

(10) Patent No.: US 11,972,546 B2
(45) Date of Patent: Apr. 30, 2024

(54) IMAGE PROCESSING APPARATUS AND IMAGE PROCESSING METHOD

(71) Applicant: CANON KABUSHIKI KAISHA, Tokyo (JP)

(72) Inventor: Satoru Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/848,055

(22) Filed: Jun. 23, 2022

(65) Prior Publication Data
US 2022/0318958 A1 Oct. 6, 2022

Related U.S. Application Data

(63) Continuation of application No. 16/548,943, filed on Aug. 23, 2019, now Pat. No. 11,398,014.

(30) Foreign Application Priority Data

Sep. 14, 2018 (JP) .................. 2018-172518

(51) Int. Cl.
G06T 5/73 (2024.01)
G06T 5/50 (2006.01)
G06T 7/20 (2017.01)

(52) U.S. Cl.
CPC .................. G06T 5/73 (2024.01); G06T 5/50 (2013.01); G06T 7/20 (2013.01); G06T 2207/20104 (2013.01); G06T 2207/20201 (2013.01)

(58) Field of Classification Search
CPC . G06T 5/003; G06T 7/20; G06T 2207/20201; G06T 7/194; H04N 19/162; H04N 5/145; H04N 23/682; H04N 25/60
See application file for complete search history.

(56) References Cited

U.S. PATENT DOCUMENTS 7,587,099 B2 * 9/2009 Szeliski .................. G06T 5/003
348/241
7,710,461 B2 5/2010 Nagano et al.
(Continued)

FOREIGN PATENT DOCUMENTS

CN 1707521 A 12/2005
JP 2007-074031 A 3/2007
(Continued)

OTHER PUBLICATIONS

Machine translation of JP-2010004329-A (Year: 2008).*
(Continued)

Primary Examiner — John Villecco
Assistant Examiner — Courtney Joan Nelson
(74) Attorney, Agent, or Firm — Cowan, Liebowitz & Latman, P.C.

(57) ABSTRACT

When swinging of a camera does not follow a motion of a subject in following-photographing, the position of the subject deviates among a plurality of images, and thus there is a problem that the subject that is moving is blurred. An image processing apparatus includes: a standard region designation unit configured to designate a partial region in an image as a standard region; a standard region motion blur setting unit configured to set a motion blur in the standard region designated by the standard region designation unit as a predetermined motion blur; and a motion blur adjustment unit configured to adjust a motion blur in the standard region so that the motion blur becomes the predetermined motion blur and adjust a motion blur on a screen of a region different from the standard region in accordance with the adjusting of the motion blur in the standard region.

13 Claims, 23 Drawing Sheets

(56) References Cited

U.S. PATENT DOCUMENTS

| | | | |
|---|---|---|---|
| 7,916,177 B2* | 3/2011 | Motomura | G06T 5/003 |
| | | | 348/208.4 |
| 8,693,776 B2* | 4/2014 | Intwala | G06T 5/003 |
| | | | 382/167 |
| 9,542,729 B2 | 1/2017 | Hirasawa et al. | |
| 2007/0165961 A1* | 7/2007 | Lu | G06T 5/10 |
| | | | 382/254 |
| 2010/0033584 A1 | 2/2010 | Watanabe | |
| 2011/0286681 A1 | 11/2011 | Ben-Ezra et al. | |
| 2012/0051662 A1* | 3/2012 | Naito | H04N 23/683 |
| | | | 382/275 |
| 2013/0230259 A1 | 9/2013 | Intwala et al. | |
| 2015/0113450 A1* | 4/2015 | Feng | G06T 5/003 |
| | | | 715/763 |
| 2016/0063669 A1 | 3/2016 | Wilensky et al. | |
| 2017/0257573 A1 | 9/2017 | Abe | |

FOREIGN PATENT DOCUMENTS

| | | | | |
|---|---|---|---|---|
| JP | 2010-015483 A | | 1/2010 | |
| JP | 2010004329 A | * | 1/2010 | G06T 5/002 |
| JP | 2010187348 A | * | 8/2010 | G06T 5/002 |
| JP | 2012-054902 A | | 3/2012 | |
| JP | 2012100000 A | * | 5/2012 | |
| JP | 2012-253713 A | | 12/2012 | |
| JP | 2017-195458 A | | 10/2017 | |
| WO | 2015-012411 A1 | | 1/2015 | |

OTHER PUBLICATIONS

Machine translation of JP-2012100000-A (Year: 2012).*
Machine translation of JP-2010187348-A (Year: 2010).*
Jul. 5, 2022 Japanese Office Action, which is enclosed without an English Translation, that issued in Japanese Patent Application No. 2018-172518.
S.K. Nayar and M. Ben-Ezra, "Motion-based motion deblurring," in IEEE Transactions on Pattern Analysis and Machine Intelligence, vol. 26, No. 6, pp. 689-698, Jun. 2004, doi: 10.1109/TPAMI.2004.1.

* cited by examiner

IMAGE PROCESSING APPARATUS AND IMAGE PROCESSING METHOD

CROSS-REFERENCE TO RELATED APPLICATION

This application is a continuation of application Ser. No. 16/548,943, filed Aug. 23, 2019, the entire disclosure of which is hereby incorporated by reference.

BACKGROUND OF THE INVENTION

Field of the Invention

The present invention relates to an image processing apparatus and an image processing method and particularly relates to a technology for controlling a motion blur of an image.

Description of the Related Art

As a photographing technique for expressing a sense of speed of a subject that is moving, there is a technique such as a panning photographing. In the panning photographing technique, an exposure time is set to be longer than a normal time period and a photographer executes following-photography by swinging a camera to follow a motion of a subject. In this way, a following-photographed image is expressed as the subject that is moving stops and a background flows due to a motion blur. On the other hand, there is a technology for generating such a panned image through image processing. The technology is an image processing technology for generating an image which seems to be actually panned by analyzing a motion among a plurality of images obtained by executing following-photographing a moving subject and adding a motion blur based on the motion.

As a technology for adding a motion blur through image processing in this way, Japanese Unexamined Patent Publication No. 2010-15483 discloses a technology for adding an optimum motion blur based on the lengths of motion vectors.

In such a panned image, it is preferable that a moving subject be stationary and a background be blurred. However, when swing of a camera does not properly follow a motion of the subject in following-photographing, the position of the subject deviates among a plurality of images and a motion blur effect is added to the subject. Therefore, there is a problem that the moving subject is undesirably blurred.

SUMMARY OF THE INVENTION

An aspect of the present invention is to realize an image processing apparatus capable of easily adjusting a reduction or the like of a motion blur of a subject that is moving and generating an improved panned image.

According to an aspect of the present invention, there is provided an image processing apparatus including: a standard region designation unit configured to designate a partial region in an image as a standard region; a standard region motion blur setting unit configured to set a motion blur in the standard region designated by the standard region designation unit as a predetermined motion blur; and a motion blur adjustment unit configured to adjust a motion blur in the standard region so that the motion blur becomes the predetermined motion blur on a screen of a region different from the standard region in accordance with the adjustment of the motion blur in the standard region.

Further features of the present invention will become apparent from the following description of exemplary embodiments with reference to the attached drawings.

DESCRIPTION OF THE EMBODIMENTS

First Embodiment

Hereinafter, preferred embodiments of the present invention will be described with reference to the drawings.

In a first embodiment of the present invention, a motion blur of an image is controlled based on a motion blur serving as a standard designated by a user. Hereinafter, the first embodiment will be described.

Figure 1:
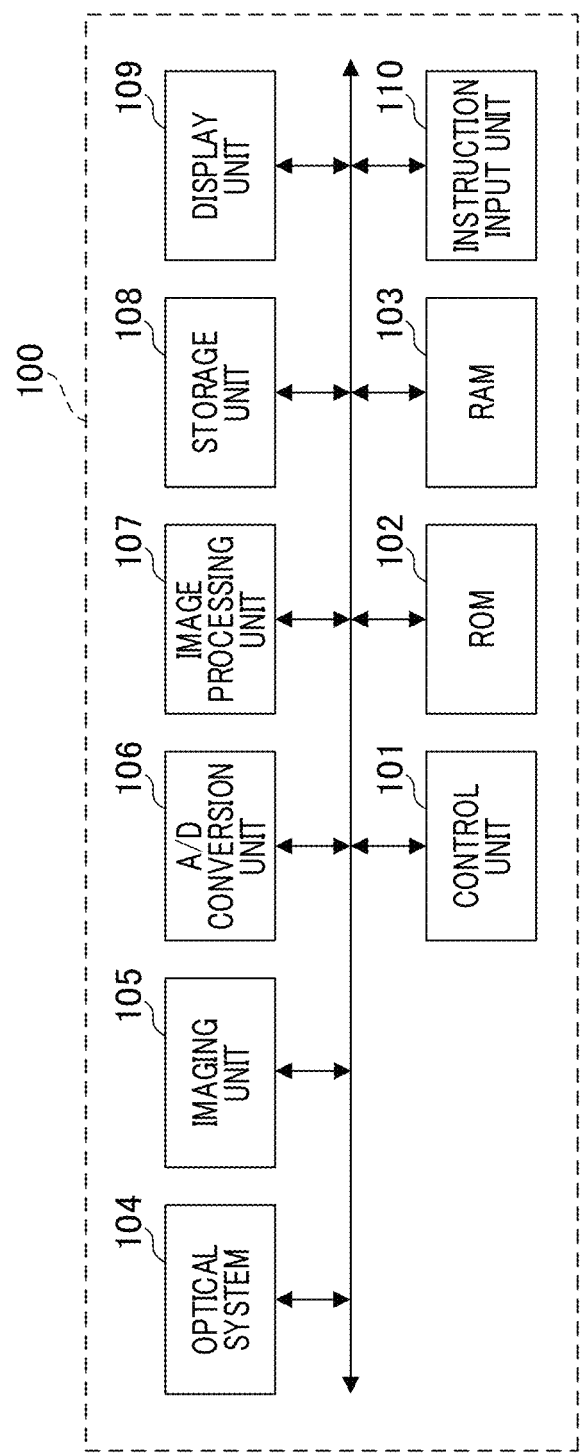
FIG. 1 is a diagram illustrating a configuration example according to an embodiment of the present invention.

FIG. 1 is a block diagram illustrating a configuration example when a motion blur control technology according to the embodiment is applied to an imaging apparatus 100. Hereinafter, the configuration example of the first embodiment will be described with reference to FIG. 1.

The control unit 101 is, for example, a CPU serving as a computer (processor) and reads an operation control program (computer program) instructions for controlling each block included in the imaging apparatus 100 from a ROM 102 serving as a storage medium to be described below. The control unit 101 loads the operation control program on a RAM 103 to be described below to execute the program instructions so that the control unit 101 controls an operation of each block included in the imaging apparatus 100. The ROM 102 is a nonvolatile memory capable of executing electric erasing and recording and stores parameters or the like necessary for an operation of each block in addition to the operation control program of each block included in the imaging apparatus 100.

The RAM 103 is a rewritable volatile memory and is used to load a program to be executed by the control unit 101 or the like, to temporarily store data generated in an operation of each block included in the imaging apparatus 100, and the like. An optical system 104 is configured as a lens group that includes a zoom lens and a focus lens and forms a subject image on an imaging surface of an imaging unit 105 to be described below.

The imaging unit 105 is, for example, an image sensor such as a CCD or a CMOS sensor, photoelectrically converts an optical image formed on the imaging surface of the imaging unit 105 by the optical system 104, and outputs an obtained analog image signal to an A/D conversion unit 106. The A/D conversion unit 106 converts the input analog image signal into digital image data. The digital image data output from the A/D conversion unit 106 is temporarily stored in the RAM 103. An image processing unit 107 applies various kinds of image processing such as white balance adjustment, color interpolation, and gamma processing on image data read out from the RAM 103. The image processing unit 107 contains a motion blur image generation unit 200 to be described in FIG. 2 and generates a motion blur image by adding a motion blur to an image data read out from the RAM 103 or a recording unit 108.

The recording unit 108 is a detachable memory card or the like. The recording unit 108 records image data processed by the image processing unit 107 as a recording image data via the RAM 103. The image data recorded on the recording unit 108 can be read and output to the image processing unit 107 via the RAM 103. A display unit 109 is a display device such as an LCD and executes displaying an image temporarily recorded on the RAM 103 or an image recorded on the recording unit 108, displaying an operation user interface for receiving an instruction from a user, and the like. An instruction input unit 110 is a touch panel, a mouse, or the like and inputs an instruction from the user.

The configuration and the basic operations of the imaging apparatus 100 have been described above.

Next, an operation of the image processing unit 107 which is characteristics of the embodiment will be described in detail. In the embodiment, an example in which a motion blur image is generated using a plurality of images each captured with short exposure time will be described.

First, a specific example of the motion blur image generation unit 200 according to the first embodiment contained in the image processing unit 107 will be described with reference to FIG. 2. The motion blur image generation unit 200 according to the first embodiment adds a motion blur to image data recorded on the recording unit 108 to generate a motion blur image.

Figure 2:
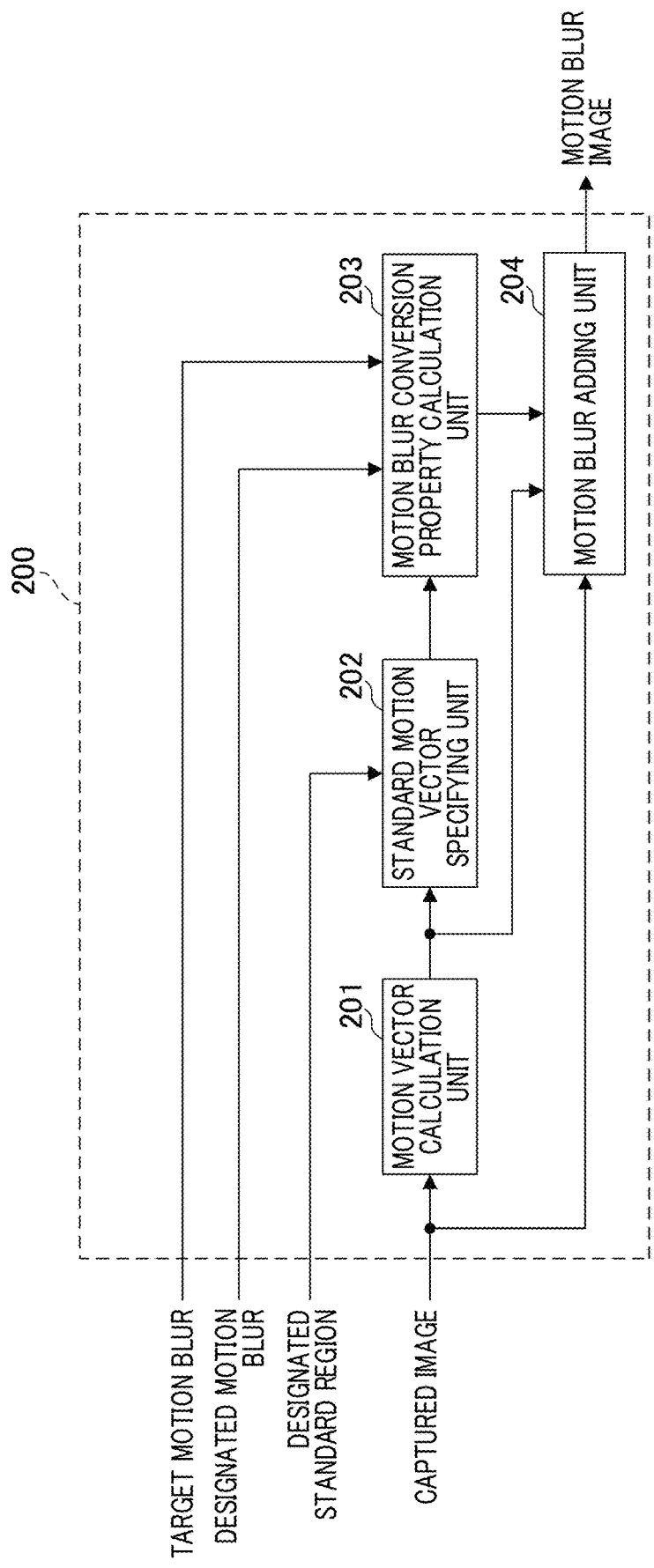
FIG. 2 is a diagram illustrating a configuration example of a motion blur image generation unit 200 according to a first embodiment.

FIG. 2 is a diagram illustrating a configuration example of the motion blur image generation unit 200. The motion blur image generation unit 200 includes a motion vector calculation unit 201, a standard motion vector specifying unit 202, a motion blur conversion property calculation unit 203, and a motion blur adding unit 204.

Next, a process of the motion blur image generation unit 200 will be described with reference to the flowchart of FIG. 3.

Figure 3:
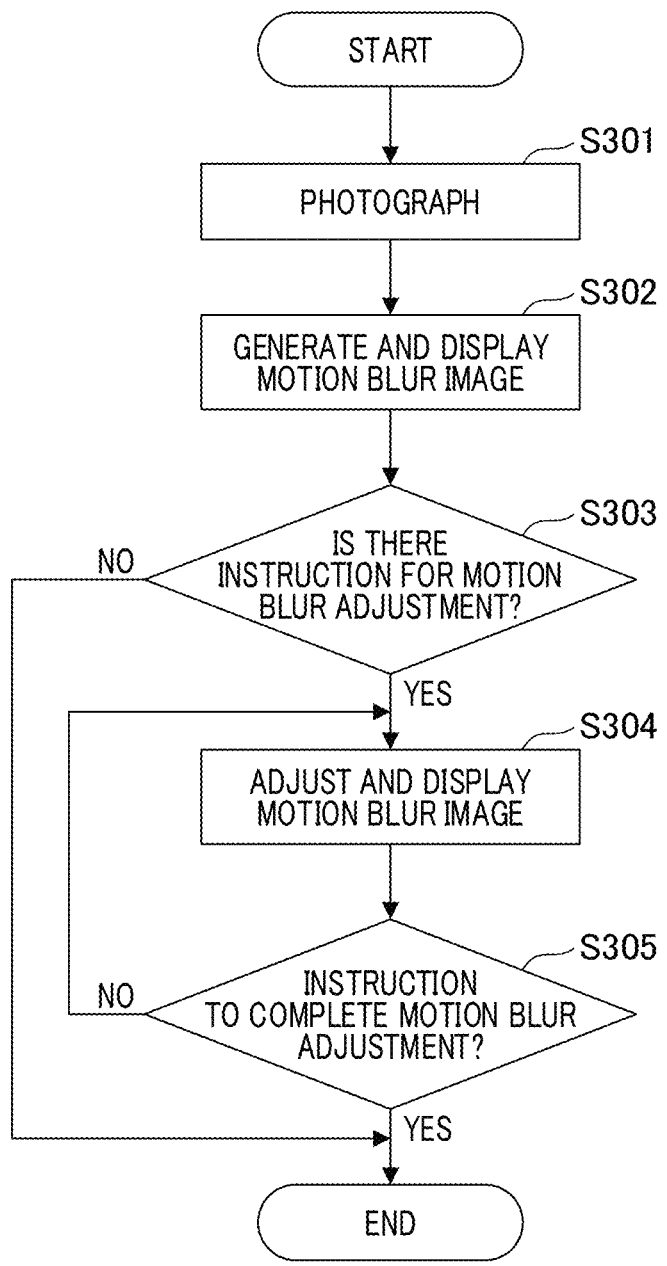
FIG. 3 is a diagram illustrating a process flow of the motion blur image generation unit 200 according to the first embodiment.

In step S301 of FIG. 3, the control unit 101 determines an exposure time with which the imaging unit 105 executes an imaging (photographing) operation. Then, the imaging unit 105 captures a plurality of images each with the determined exposure time and records the plurality of captured images on the recording unit 108. In the embodiment, an example in which 60 images are captured per second as an imaging frame rate will be described. That is, the imaging unit 105 captures one image every 1/60th of a second. The exposure time may be determined via the instruction input unit 110 by the user or may be determined through automatic exposure control by the control unit 101.

A method of determining the exposure time through the automatic exposure control is, for example, a method of determining an exposure time based on a photometric value for each predetermined region of a captured image captured by the imaging unit 105. It is so designed that the exposure time for capturing each of the plurality of images is a time shorter than a proper exposure time of an image when the panning photographing is executed by taking only one image with panning operation, so that the plurality of images with less motion blur are captured. When capturing the plurality of images with the shorter exposure time, an aperture is relatively opened to increase brightness of each image.

Figure 4A:
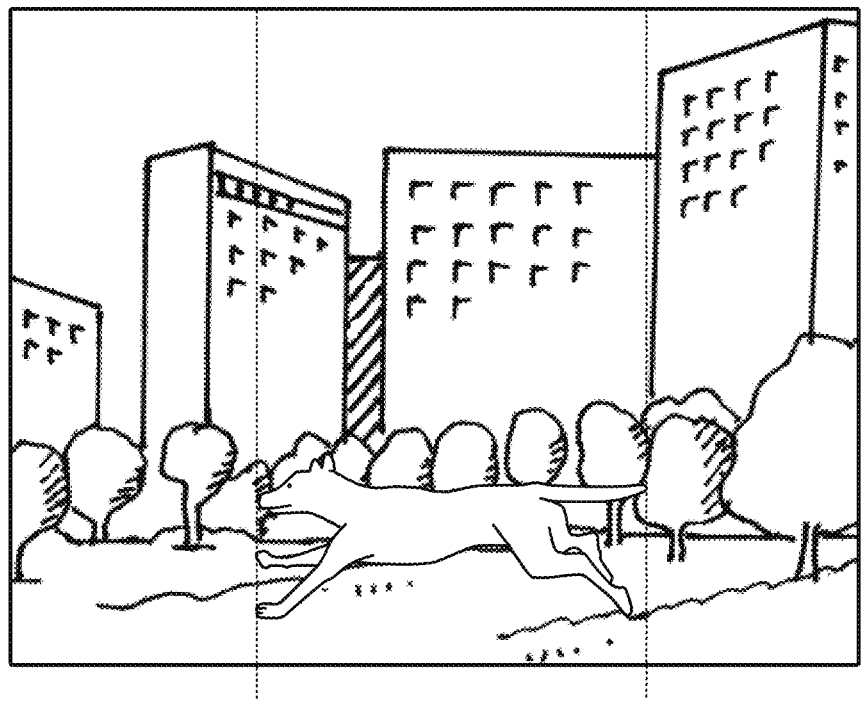
FIGS. 4A and 4B are diagrams illustrating captured images in a dog scene.
Figure 4B:
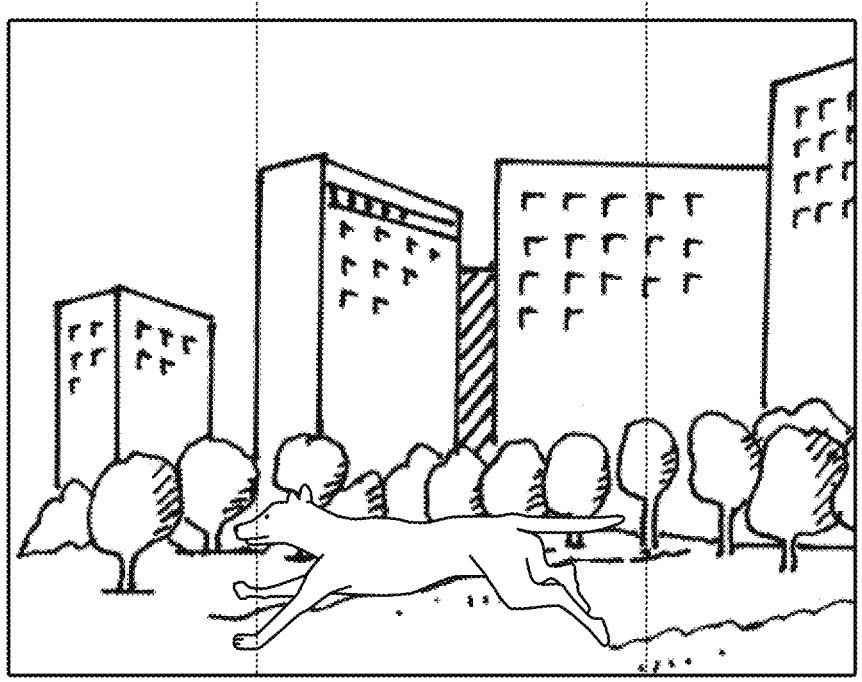

Examples of captured images will be explained with reference to FIGS. 4A and 4B. FIGS. 4A and 4B illustrate an example in which a photographer swings the imaging apparatus to follow a running dog and to execute consecutive shooting. FIG. 4A illustrates a captured image of an Nth frame and FIG. 4B illustrates a captured image of an N+1th frame. Here, N is a positive integer. Since the imaging is respectively executed for a short exposure time, a large motion blur does not occur in the captured images.

In following-photographing in reality, it is difficult to accurately swing the imaging apparatus for following the running dog. In particular, it is very difficult to swing the imaging apparatus when a motion of a subject is fast and its motion is not predictable. In the example of FIGS. 4A and 4B, captured images when the swinging of the imaging apparatus to follow the running dog is a bit delayed are exemplified and the dog of the captured image of the N+1th frame may be moved further to the left than the captured image of the Nth frame.

In step S302 of FIG. 3, the motion blur image generation unit 200 generates a motion blur image from the captured image of the Nth frame captured (photographed) in step S301 and outputs the motion blur image to the display unit 109 for displaying. The details of the motion blur image generation process of step S302 will be described below with reference to FIG. 5. Within a predetermined time after a motion blur image is displayed on the display unit 109 in step S302, the user can give an instruction for motion blur adjustment (correction) with the instruction input unit 110.

Specifically, for example, at least a partial region of an image displayed on a display screen is clicked using a user interface (UI) such as a mouse. Alternatively, the user can give an instruction for motion blur adjustment (correction) by touching the partial region of the image displayed on the display screen. That is, the user can give an instruction indicating that a certain region in the screen is subject to the motion blur adjustment. At this time, a plurality of points/regions may be touched or clicked with a mouse or a region may be surrounded by a drag operation. Further, at this time, the user can also give an instruction for a motion blur amount (motion blur setting). These instructions are referred to as an instruction for motion blur adjustment (correction). A region designated (set) by the user in this way is referred to as a standard region.

In step S303 of FIG. 3, it is determined whether an instruction for motion blur adjustment (correction) is given via the instruction input unit 110 within the predetermined time after the motion blur image is displayed on the display unit 109 in step S302. When the instruction for motion blur adjustment (correction) is not received within the predetermined time in step S303, the process ends. When the instruction for motion blur adjustment (correction) is received in step S303, the process proceeds to step S304. In S304, the motion blur image generation unit 200 corrects a motion blur of a designated (set) subject and outputs a motion blur image to the display unit 109 for displaying based on the received user instruction related to the motion blur. A method of adjusting the motion blur in step S304 will be described below. The user can check the corrected motion blur image displayed on the display unit 109 in step S304 and give an instruction to complete the motion blur adjustment via the instruction input unit 110.

In step S305 of FIG. 3, the control unit 101 determines whether there is an instruction to complete the motion blur adjustment (correction) via the instruction input unit 110. When the instruction to complete the motion blur adjustment (correction) is received in step S305, the process ends. When the instruction to complete the motion blur adjustment (correction) is not received in step S305, the process returns to step S304 of FIG. 3 and the motion blur adjustment (correction) is repeated.

Next, the details of the generation of the motion blur image in step S302 of FIG. 3 will be described with reference to the flowchart of FIG. 5.

Figure 5:
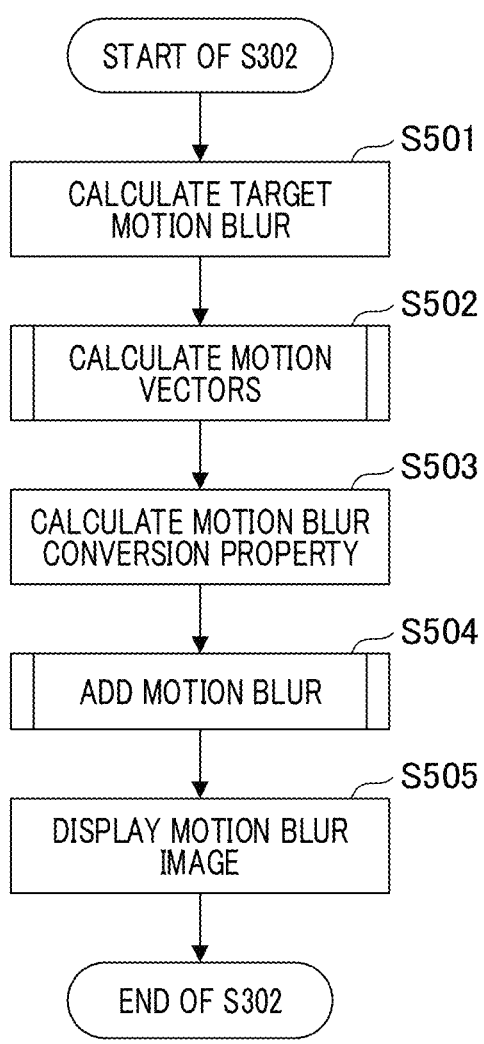
FIG. 5 is a diagram illustrating a flow of a process of generating a motion blur image in step S302.

In step S501 of FIG. 5, the control unit 101 calculates a target motion blur. The target motion blur is information indicating a target exposure time for obtaining a corresponding length of motion blur. The length of the motion blur is changed depending on the target motion blur. For example, the length of a motion blur corresponding to $\frac{1}{60}$th of a second is twice the length of a motion blur corresponding to $\frac{1}{120}$th of a second. In the embodiment, the target motion blur is assumed to be a motion blur corresponding to $\frac{1}{60}$th of a second.

In step S502 of FIG. 5, the motion vector calculation unit 201 calculates motion vectors between a plurality of captured images recorded on the recording unit 108 and outputs the motion vectors to the standard motion vector specifying unit 202 and the motion blur adding unit 204. Here, a method of calculating the motion vectors in step S502 will be described with reference to FIGS. 6, 7, and 8.

Figure 6:
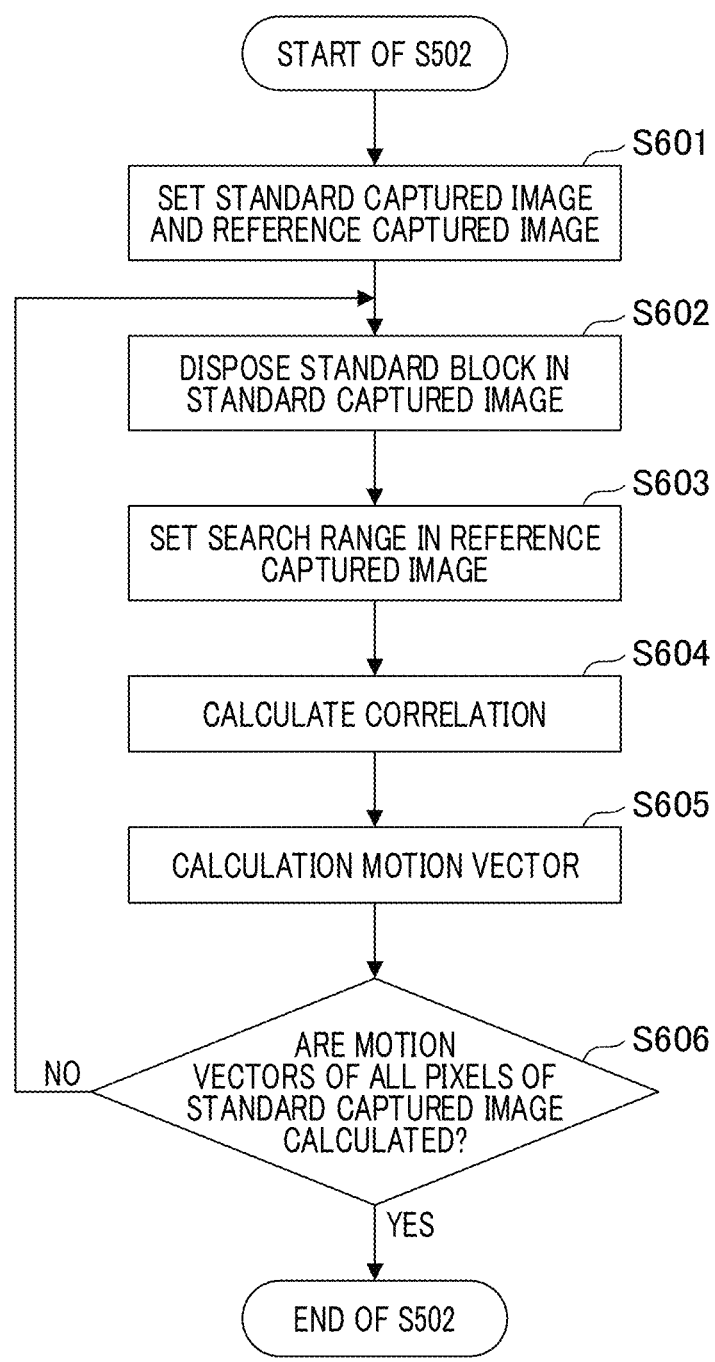
FIG. 6 is a diagram illustrating a process flow of a motion vector calculation unit 201.
Figure 7:
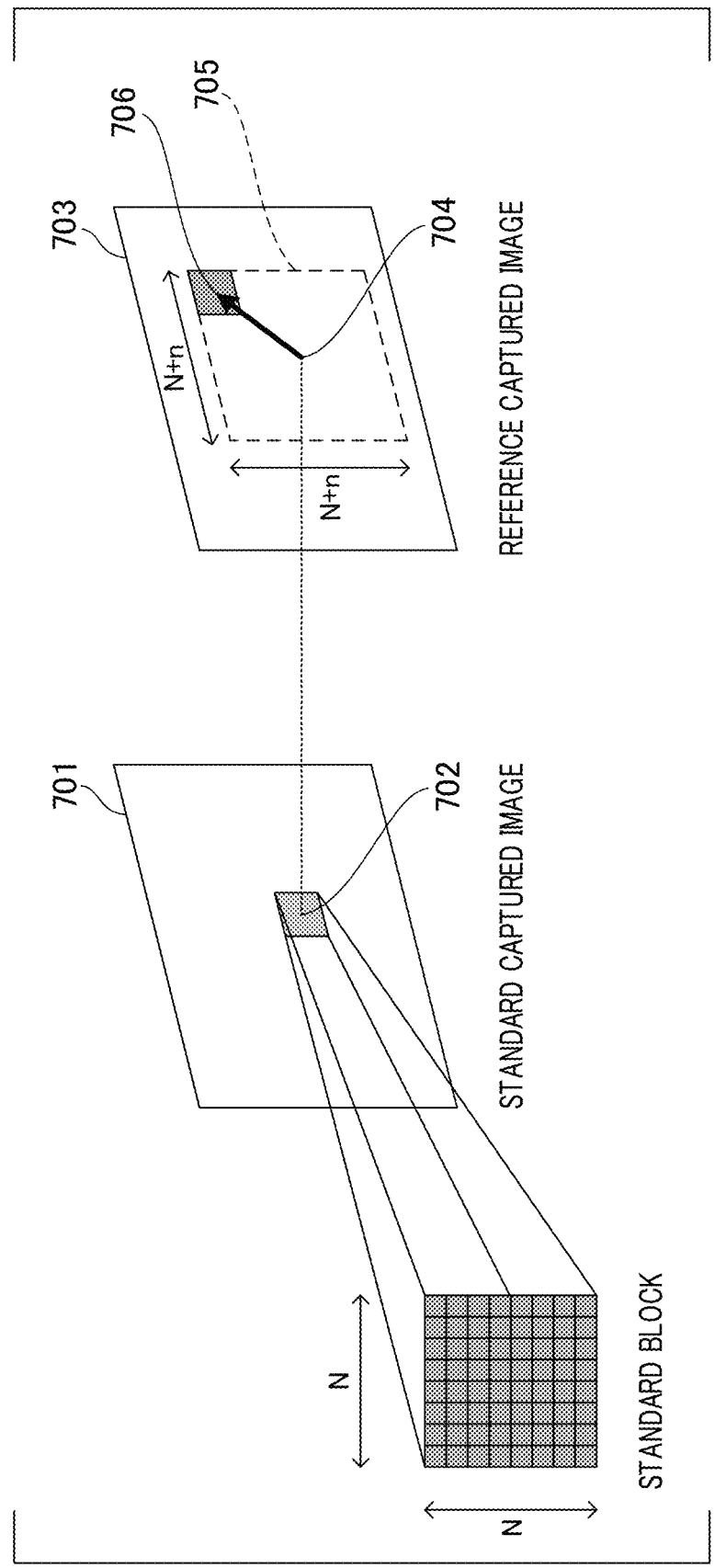
FIG. 7 is a diagram illustrating a method of calculating a motion vector.

FIG. 6 is a flowchart illustrating the details of a flow of a process of calculating the motion vectors in step S502 by the motion vector calculation unit 201. FIG. 7 is a diagram for describing a method of calculating motion vectors in accordance with a block matching method. In the embodiment, the block matching method will be described as an example of the technique for calculating the motion vectors, but the technique for calculating the motion vectors is not limited thereto. For example, an optical flow technique may be used.

In step S601 of FIG. 6, the motion vector calculation unit 201 reads and acquires, for example, two captured images recorded on the recording unit 108. Instead of acquiring the plurality of images temporarily recorded on the recording unit 108, the plurality of images may be acquired directly from an output of an image sensor. Then, the captured image of the Nth frame is set as a standard captured image and the captured image of the N+1th frame is set as a reference captured image.

In step S602 of FIG. 6, a standard block 702 of N×N pixels is disposed in a standard captured image 701 as in FIG. 7.

In step S603 of FIG. 6, neighboring (N+n)×(N+n) pixels at the same coordinates 704 as the standard block 702 are set as a search range 705 in the reference captured image 703 as in FIG. 7.

In step S604 of FIG. 6, a correlation operation of a reference block of N×N pixels at different coordinates in the search range 705 of the reference captured image 703 and the standard block 702 of the standard captured image 701 is executed to calculate a correlation value. The correlation value is calculated based on an inter-image difference absolute value sum of the pixels of the standard block 702 and the reference block. That is, coordinates at which the value of the difference absolute value sum is the smallest are coordinates at which the correlation value is the highest. A method of calculating the correlation value is not limited to the difference absolute value sum. For example, the correlation value may be calculated based on a difference square-sum or a normalized mutual correlation value. In the example of FIG. 7, a reference block 706 has the highest correlation.

In step S605 of FIG. 6, a motion vector is calculated based on reference block coordinates indicating the highest correlation value. In the example of FIG. 7, a difference between central coordinates of the reference block 706 and central coordinates 704 of the standard block 702 of the standard captured image 701 is set as the motion vector.

In step S606 of FIG. 6, the processes of steps S602, S603, S604, and S605 are repeated while shifting/scanning the standard block 702 in FIG. 7 to calculate the motion vectors of all the pixels of the standard captured image 701. Instead of calculating the motion vectors of all the pixels, motion vectors of predetermined intermittent pixels may be calculated.

Figure 8:
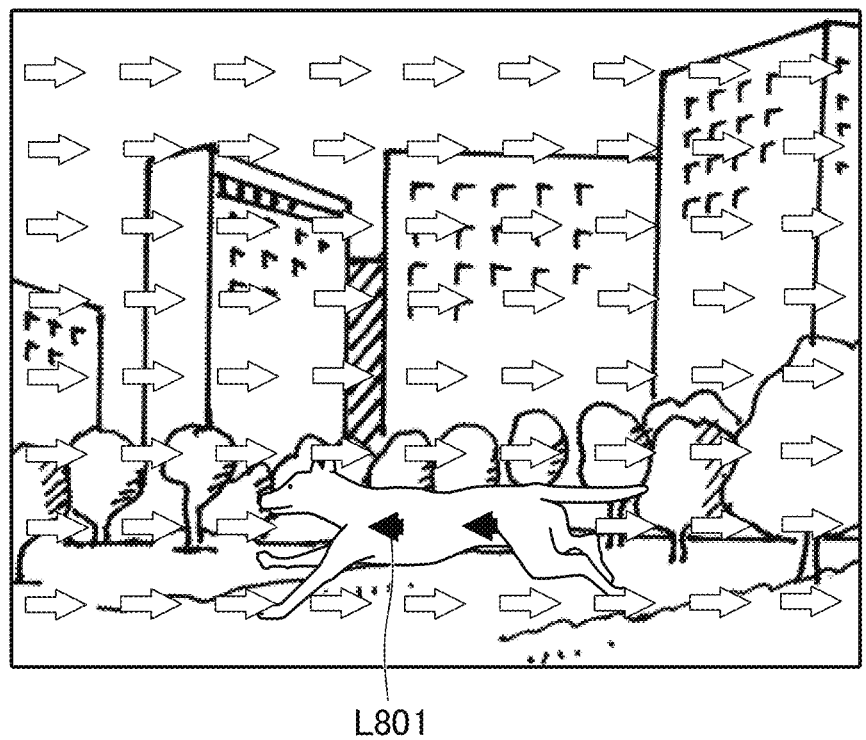
FIG. 8 is a diagram illustrating a motion vector in a dog scene.

An example of the motion vectors between the captured images calculated based on the foregoing method is illustrated in FIG. 8. FIG. 8 is a diagram illustrating motion vectors when the captured image of the Nth frame in FIG. 4A is set as the standard captured image and the captured image of the N+1th frame in FIG. 4B is set as the reference captured image. Arrows in FIG. 8 indicate the motion vectors, the lengths of the arrows indicate the lengths of the motion vectors, and directions of the arrows indicate directions of the motion vectors. In the example of FIG. 8, only intermittent representative motion vectors are simply illustrated rather than the motion vectors of all the pixels.

In the example of FIG. 8, following-photographing is executed to follow the running dog by swinging the imaging apparatus 100 from the right to the left but slightly behind the dog. Therefore, motion vectors in the rightward direction are detected with regard to stationary objects of the background and the motion vectors in the leftward direction are detected with regard to the running dog.

Next, referring back to FIG. 5, the process proceeds to step S503. Since the user does not yet correct the motion blur in the stage of S503, the standard motion vector specifying unit 202 is passed and the motion blur conversion property calculation unit 203 is operated. That is, based on the target motion blur calculated in step S501, a property for converting the motion vectors calculated in step S502 into motion blur adding information is calculated. The motion blur adding information includes a motion blur amount in the horizontal direction and a motion blur amount in the vertical direction, and is used for determining a direction and a motion blur amount (length) of a final motion blur when the motion blur adding unit 204 adds the motion blur.

Figure 9:
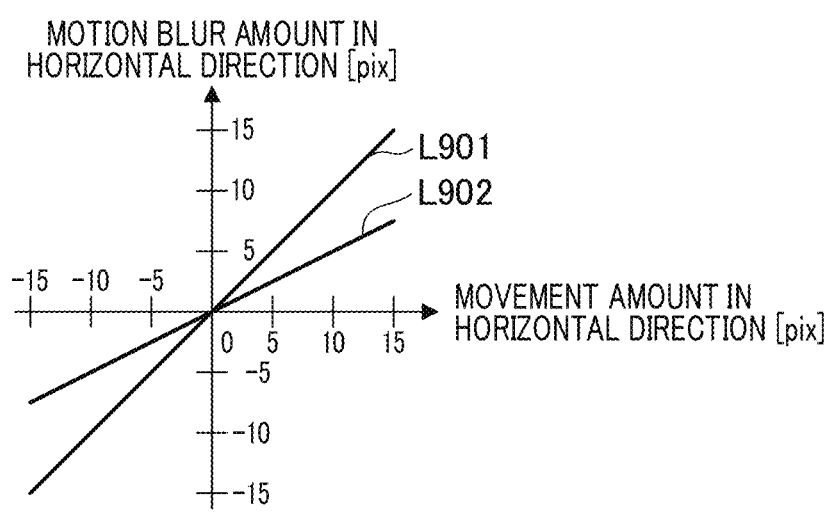
FIG. 9 is a diagram illustrating a motion blur conversion property.

A method of calculating the motion blur conversion property will be described with reference to FIG. 9. FIG. 9 is a diagram illustrating the motion blur conversion property. The motion vector consists of a movement amount and a 2-dimensional direction, which are defined by motion vector components in the horizontal direction and the vertical direction. In the embodiment, for convenience's sake, a conversion property for converting the component (movement amount) of the motion vector in the horizontal direction into a motion blur amount in the horizontal direction is indicated. The description of a motion blur conversion property and a method of converting a motion blur amount with regard to the motion vector consisting of the movement amount and the 2-dimensional direction will be omitted as they are calculated through a similar process.

A motion blur conversion property L901 in FIG. 9 is represented in Expression (1), for example. Here, the target motion blur calculated in step S501 corresponds to ⅙₀th of a second.

Motion blur amount in horizontal direction=movement amount in horizontal direction  Expression (1)

Since a frame rate of captured images is 60 per second, the movement amount in the horizontal direction is a movement amount for ⅙₀th of a second. In the motion blur conversion property L901, a motion blur amount corresponding to the movement amount for ⅙₀th of a second is calculated.

A motion blur conversion property L902 in FIG. 9 is represented in Expression (2), for example. The target motion blur is a motion blur conversion property in the case corresponding to, for example, ¹⁄₁₂₀th of a second.

Motion blur amount in horizontal direction=½× movement amount in horizontal direction  Expression (2)

In the motion blur conversion property L902, a motion blur amount equivalent to the movement amount for ¹⁄₁₂₀th of a second which is half of the movement amount for ⅙₀th of a second is calculated.

By changing the motion blur conversion property in this way, it is possible to control the motion blur amount.

Subsequently, the process proceeds to step S504 of FIG. 5 and the motion blur adding unit 204 adds a motion blur to the captured image based on the motion blur conversion property calculated by the motion blur conversion property calculation unit 203 and the motion vector of each pixel calculated by the motion vector calculation unit 201. Then, in step S505, the motion blur image is output to the display unit 109 to be displayed.

Figure 10:
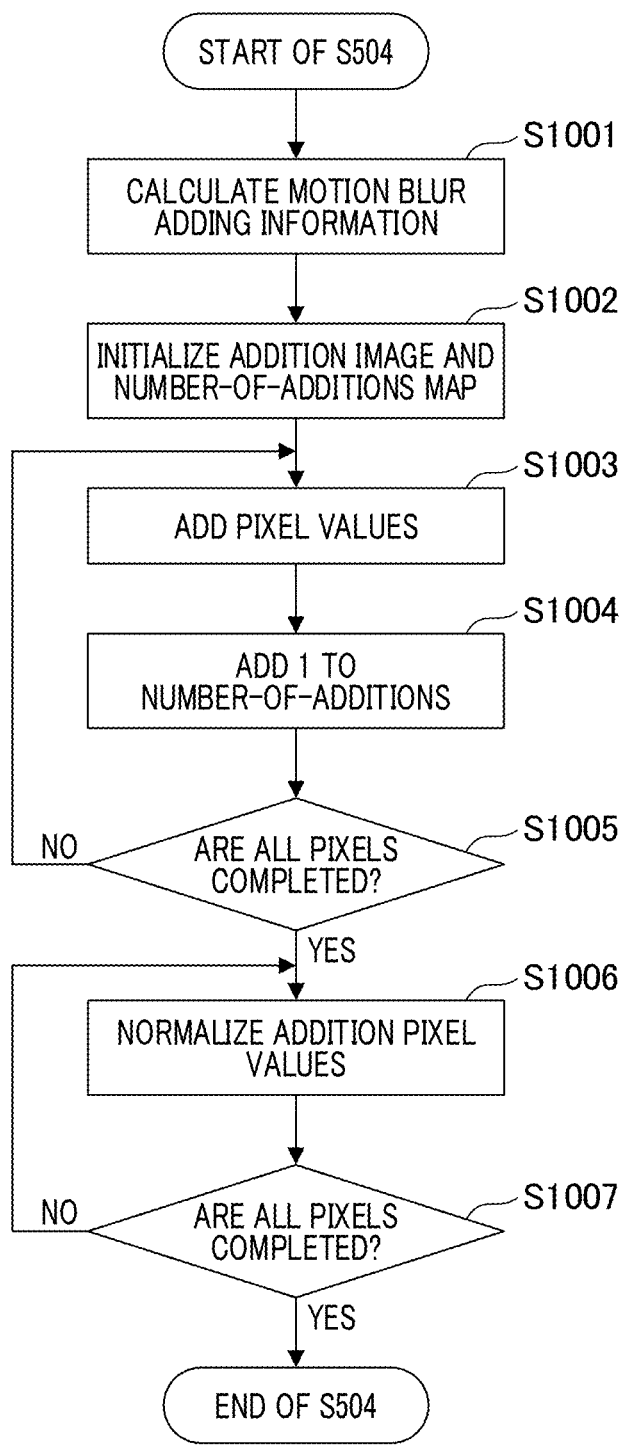
FIG. 10 is a diagram illustrating a process flow of a motion blur adding unit 204.
Figure 11:
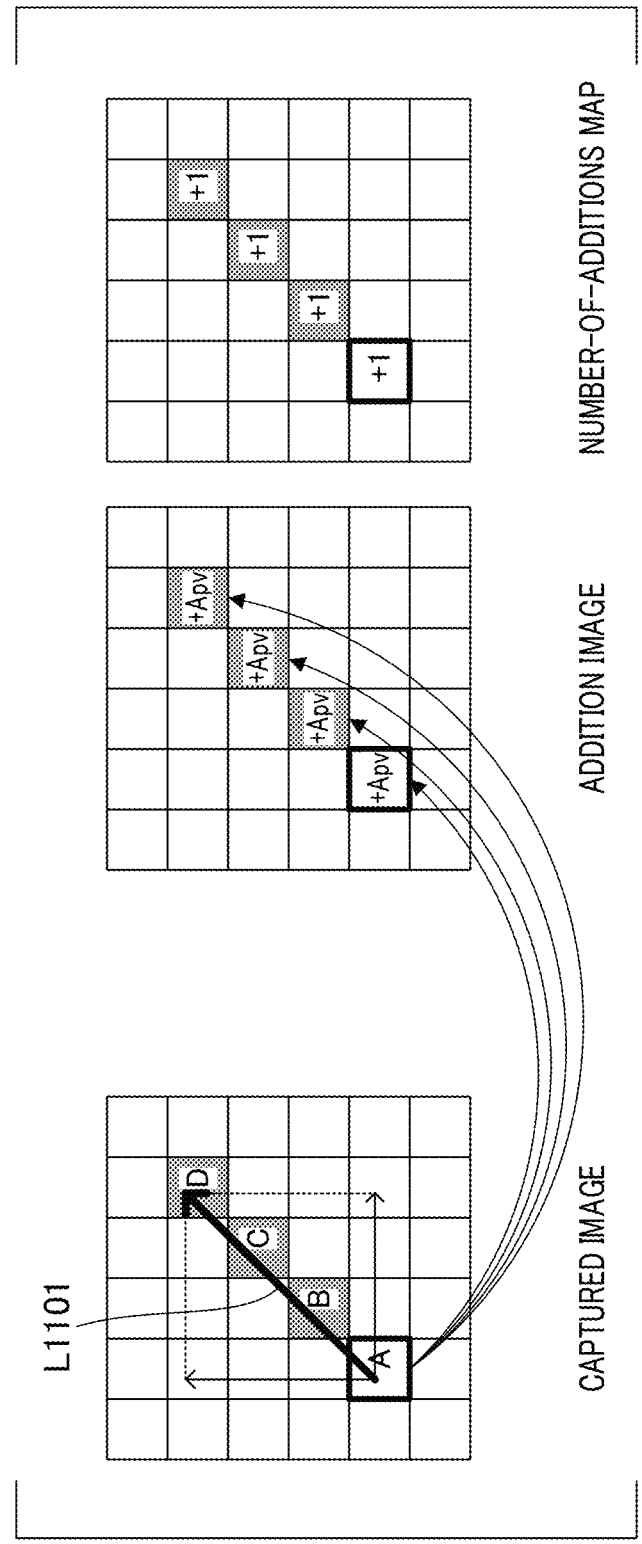
FIG. 11 is a diagram illustrating a method of adding a motion blur.

Next, a method of adding the motion blur in step S504 of FIG. 5 will be described in detail with reference to FIGS. 10 and 11. FIG. 10 is a flowchart illustrating a flow of the process of adding the motion blur in step S504 by the motion blur adding unit 204. FIG. 11 is a diagram for describing a method of adding the motion blur by the motion blur adding unit 204.

In step S1001 of FIG. 10, the motion blur adding unit 204 calculates motion blur adding information for each pixel by converting the motion vector of each pixel calculated by the motion vector calculation unit 201 based on the motion blur conversion property calculated by the motion blur conversion property calculation unit 203. An example of the motion blur adding information is illustrated in FIG. 11. L1101 in FIG. 11 indicates motion blur adding information of a pixel A of interest. In the case of this example, the motion blur adding information L1101 is motion blur adding information reaching from the pixel A to a pixel D via pixels B and C. A motion blur amount in the horizontal direction is indicated as 4 pixels and a motion blur amount in the vertical direction is indicated as 4 pixels.

In step S1002 of FIG. 10, the motion blur adding unit 204 initializes an addition image and a number-of-additions map to be described below. The addition image is initialized to a pixel value of 0. The number-of-additions map is initialized to the number of additions of 0.

In step S1003 of FIG. 10, the motion blur adding unit 204 adds a pixel value (the initial value of 0) of the addition image and a pixel value of the captured image for each pixel based on the motion blur adding information. Then, in step S1004 of FIG. 10, the motion blur adding unit 204 adds (counts up) 1 to the number of additions of the number-of-additions map based on the motion blur adding information.

A method of adding pixel values and a method of adding the number of additions will be described with reference to FIG. 11.

The motion blur adding unit 204 updates an addition pixel value Aaddpv by adding a pixel value Apv of the pixel A of interest in the captured image to the addition pixel value Aaddpv of the pixel A of interest in the addition image, as represented in Expression (3). Then, as represented in Expression (4), 1 is added to the number of additions Acnt in the number-of-additions map.

$Aaddpv = Aaddpv + Apv$  Expression (3)

$Acnt = Acnt + 1$  Expression (4)

The motion blur adding unit 204 updates an addition pixel value Baddpv by adding the pixel value Apv of the pixel A of interest in the captured image to the addition pixel value Baddpv of a pixel B of interest in the addition image, as represented in Expression (5). Then, as represented in Expression (6), 1 is added to the number of additions Bcnt in the number-of-additions map.

$Baddpv = Baddpv + Apv$  Expression (5)

$Bcnt = Bcnt + 1$  Expression (6)

Similarly, the motion blur adding unit 204 updates an addition pixel value Caddpv by adding a pixel value Apv of the pixel A of interest in the captured image to the addition pixel value Caddpv of a pixel C in the addition image, as represented in Expression (7). Then, as represented in Expression (8), 1 is added to the number of additions Ccnt in the number-of-additions map.

$Caddpv = Caddpv + Apv$  Expression (7)

$Ccnt = Ccnt + 1$  Expression (8)

Finally, the motion blur adding unit 204 updates an addition pixel value Daddpv by adding a pixel value Apv of the pixel A of interest in the captured image to the addition pixel value Daddpv of a pixel D of interest in the addition image, as represented in Expression (9). Then, as represented in Expression (10), 1 is added to the number of additions Dcnt in the number-of-additions map.

$$Daddpv=Daddpv+Apv \quad \text{Expression (9)}$$

$$Dcnt=Dcnt+1 \quad \text{Expression (10)}$$

In this way, the addition of the pixel value of the pixel A of interest and the counting-up of the number of additions are executed on the pixels A, B, C, and D through which the motion blur adding information passes.

In step S1005 of FIG. 10, the motion blur adding unit 204 repeats the addition of the pixel value and the counting-up of the number of additions on all the pixels of the captured image based on the motion blur adding information in steps S1003 and S1004 to generate the addition image and the number-of-additions map.

In step S1006 of FIG. 10, the motion blur adding unit 204 normalizes the addition pixel values by dividing the addition pixel value of the addition image by the number of additions of the number-of-additions map for each pixel. Through the division process, an average value of the added pixel values can be calculated.

In step S1007 of FIG. 10, the motion blur adding unit 204 repeats the process of normalizing the addition pixel values in step S1006 by all the pixels to generate a motion blur image.

The method of adding the motion blur in step S504 of FIG. 5 has been described above.

Subsequently, in step S505 of FIG. 5, the motion blur image generated by the motion blur adding unit 204 in step S504 of FIG. 5 is displayed on the display unit 109.

Then, the process of generating the motion blur image in step S302 of FIG. 3 ends.

Next, a method of adjusting (correcting) the motion blur in step S304 when the user gives an instruction for motion blur adjustment (correction) in step S303 of FIG. 3 will be described in detail with reference to the flowchart of FIG. 12.

Figure 12:
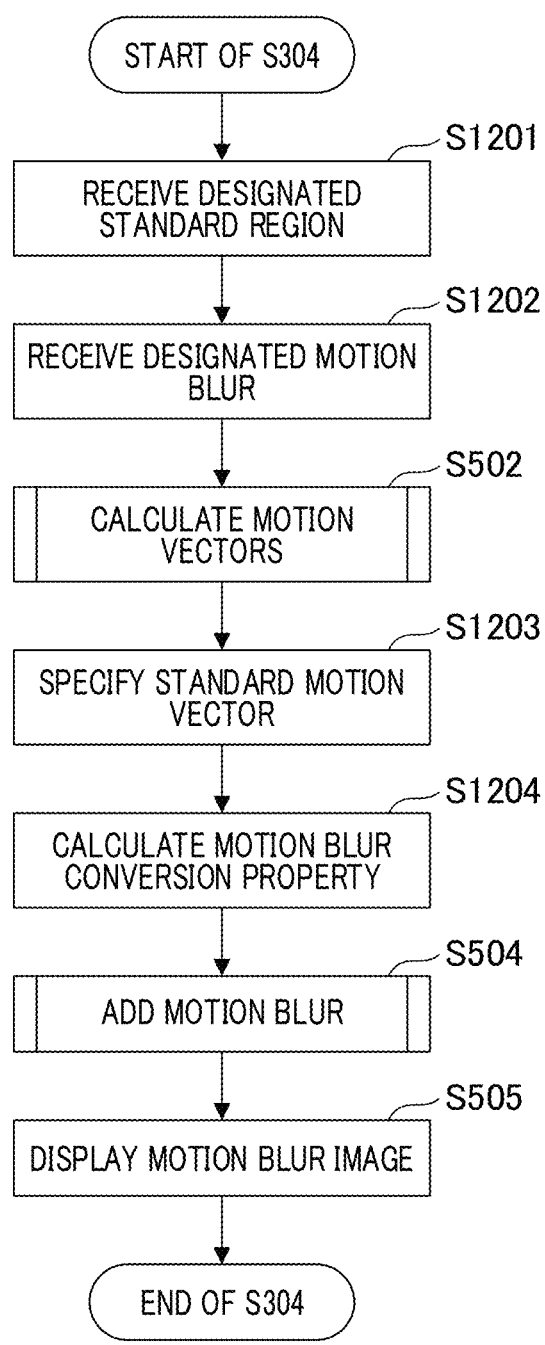
FIG. 12 is a diagram illustrating a flow of a process of adjusting a motion blur in step S304.

In step S1201 of FIG. 12, the control unit 101 receives an instruction for a designated standard region (that is, a subject region in which a motion blur should be corrected/adjusted in an image) as the instruction for motion blur adjustment from the user via the instruction input unit 110. In step S1202 of FIG. 12, the control unit 101 receives an instruction for a designated motion blur in the designated standard region (that is, a correction amount of the motion blur for the designated subject region) as the instruction for motion blur adjustment from the user via the instruction input unit 110.

Next, a method of receiving an instruction for motion blur adjustment (correction) will be described with reference to FIG. 13.

Figure 13A:
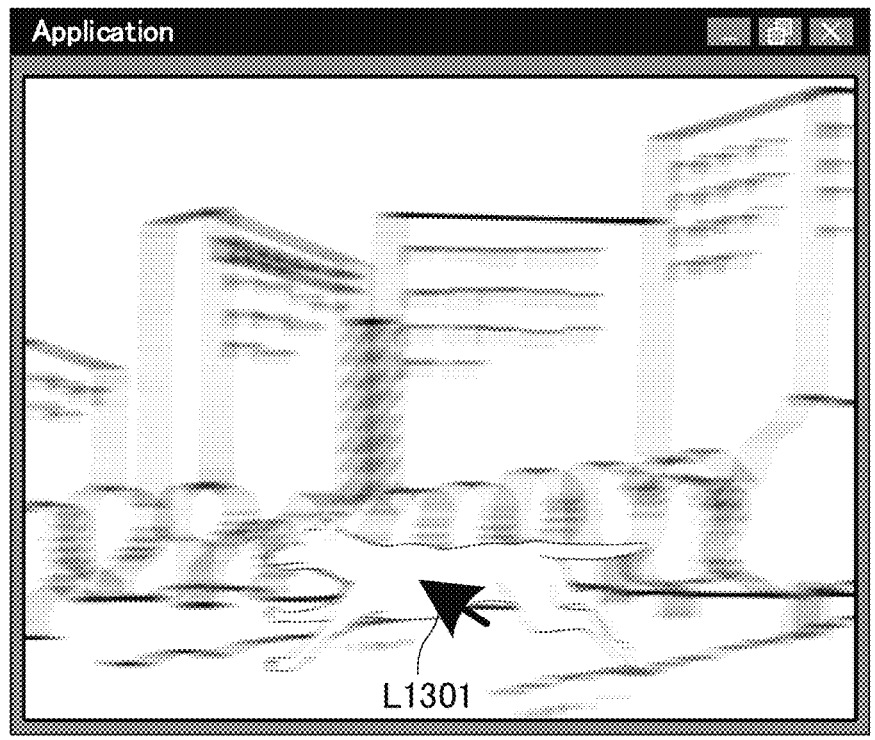
FIGS. 13A and 13B are diagrams illustrating images before and after motion blur adjustment in the dog scene.
Figure 13B:
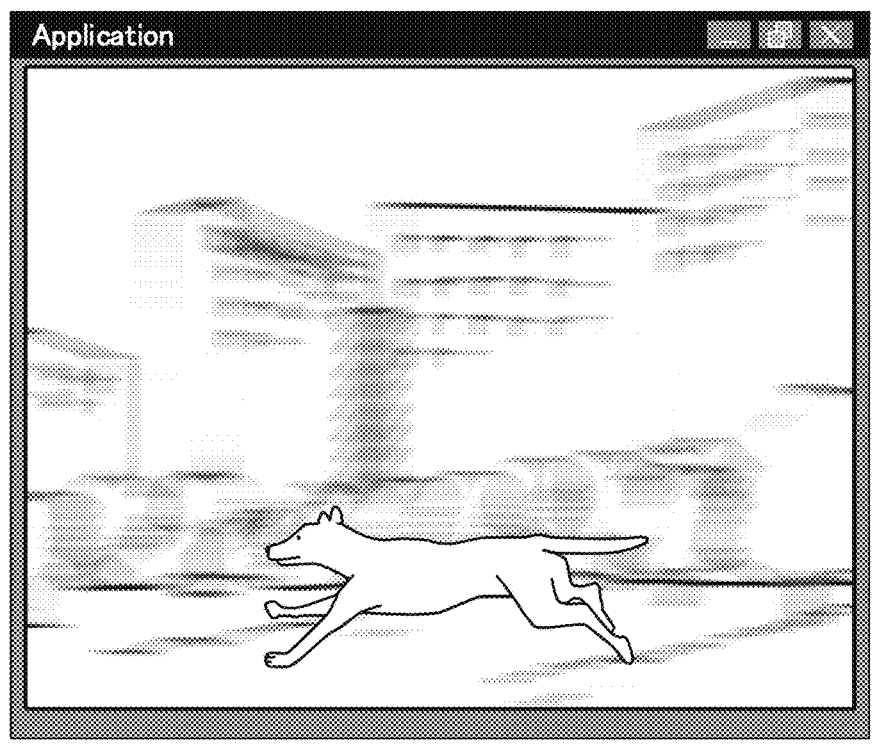

FIG. 13A illustrates an image before the motion blur adjustment (correction) and FIG. 13B illustrates an image after the motion blur adjustment (correction). The image before the motion blur adjustment (correction) in FIG. 13A is a motion blur image displayed on the display unit 109 after the motion blur image is generated in step S302 of FIG. 3. The user checks the motion blur image displayed on the display unit 109 and determines whether it is necessary to adjust the motion blur image (the determination executed by the user before step S303 of FIG. 3).

Here, in the example of the image before the motion blur adjustment in FIG. 13A, not only the background but also a main subject is blurred up to the running dog. This is because the dog is moved between the captured images as in FIGS. 4A and 4B, this movement is detected as a motion, and a motion blur is automatically added based on the motion vectors since the running dog is slightly faster than the swing of following-photography.

In general, an image in which a main subject stops without being blurred and a background is blurred is considered to be preferable as a panned image since the main subject looks more speedy. In the embodiment, before the motion blur adjustment, the user can check a motion blur image such as the image in FIG. 13A, then the user can execute a touch operation on a touch panel or a click operation with a mouse to give an instruction to adjust (correct) the motion blur image. Specifically, as indicated by L1301 in FIG. 13A, the user executes a touch operation or a click operation on a region in which the user desires to adjust (correct) the motion blur. At this time, in the embodiment, the user can also give an instruction for adjusting an amount of the motion blur of the designated (standard) region so that the motion blur increases or decreases according to a way of touch operation or a way of a click operation.

For example, when the user designates the motion blur with a single touch or a single clock, the control unit 101 regards the instruction to decrease the motion blur by a predetermined amount (or to zero) as a designated motion blur for the designated standard region. When the user designates the motion blur by a double touch or a double click, the control unit 101 regards the instruction to increase the motion blur by a predetermined amount as the designated motion blur for the designated standard region.

For example, when the motion blur of the dog in the image in FIG. 13A, which is before the motion blur adjustment, is adjusted to be smaller, the user designates the running dog by a single click. Then, coordinates designated by the control unit 101 are received and set as the designated standard region and the instruction to decrease the motion blur by a predetermined amount (or to zero) is received and set as the designated motion blur of the designated standard region. In the following description, an example in which the user clicks and designates the running dog by a single click to decrease the motion blur of the dog by a predetermined amount will be described.

When the user designates, for example, a circle surrounding the entire running dog, as well as the coordinates of one point designated by the user, the control unit 101 may regards the surrounded region as the designated standard region.

When the designated motion blur is received in step S1202 of FIG. 12 in this way, the motion vector calculation unit 201 calculates the motion vectors between the plurality of captured images recorded on the recording unit 108 again subsequently in step S502 of FIG. 12. Specifically, the motion vector calculation unit 201 acquires the captured image of the Nth frame in FIG. 4A and the captured image of the N+1th frame in FIG. 4B and calculates the motion vectors such as shown in FIG. 8. The calculation of the motion vectors in step S502 of FIG. 12 is carried out in the same way as that in step S502 of FIG. 5. The motion vectors calculated in the process of generating the motion blur image in step S302 of FIG. 3 may be stored in the recording unit 108 or the like and may be utilized in step S502 of FIG. 12.

Subsequently, in step S1203 of FIG. 12, the standard motion vector specifying unit 202 specifies (sets) the standard motion vector based on the designated standard region received by the control unit 101 in step S1201 and the motion vectors calculated by the motion vector calculation unit 201. Specifically, in FIG. 8, a motion vector L801 of the designated standard region (the dog) is specified (set) as the standard motion vector. When there is the plurality of motion vectors in the designated standard region, a histogram (frequency distribution) of the motion vectors in the designated standard region is acquired and the motion vector with the highest frequency is automatically set as a standard motion vector.

Next, in step S1204 of FIG. 12, the motion blur conversion property calculation unit 203 calculates the motion blur conversion property based on the target motion blur, the standard motion vector, and the designated motion blur. A method of calculating the motion blur conversion property will be described with reference to FIGS. 14A to 14C. The motion blur conversion property in FIGS. 14A to 14C is an example of the motion blur conversion property when the control unit 101 calculates the motion blur corresponding to 1/60th of a second as the target motion blur.

The motion vector consists of a movement amount and a 2-dimensional direction decided by the motion vector components in the horizontal direction and the vertical direction. However, in the embodiment, to facilitate the description, the motion blur conversion property in which the movement amount of the motion vector in the horizontal direction is converted into a motion blur amount in the horizontal direction is shown. The description of a motion blur conversion property and a method of converting a motion blur amount for the motion vector consisting of the movement amount and the 2-dimensional direction will be omitted since they are calculated through a similar process.

Figure 14A:
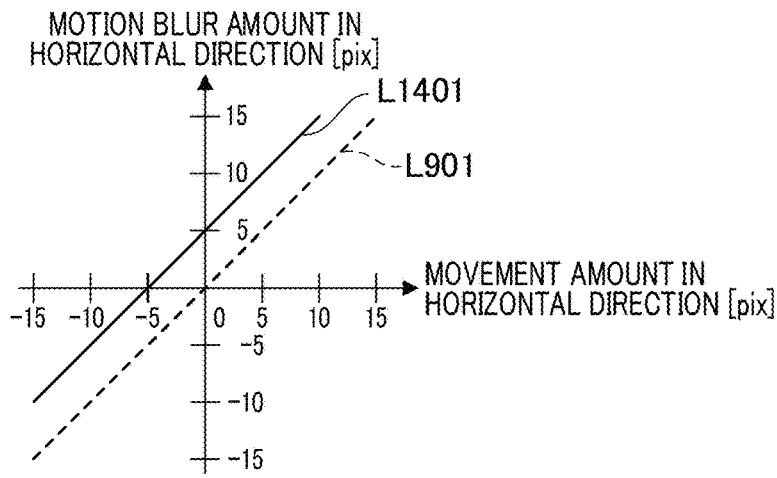
FIGS. 14A to 14C are diagrams illustrating a motion blur conversion property.
Figure 14B:
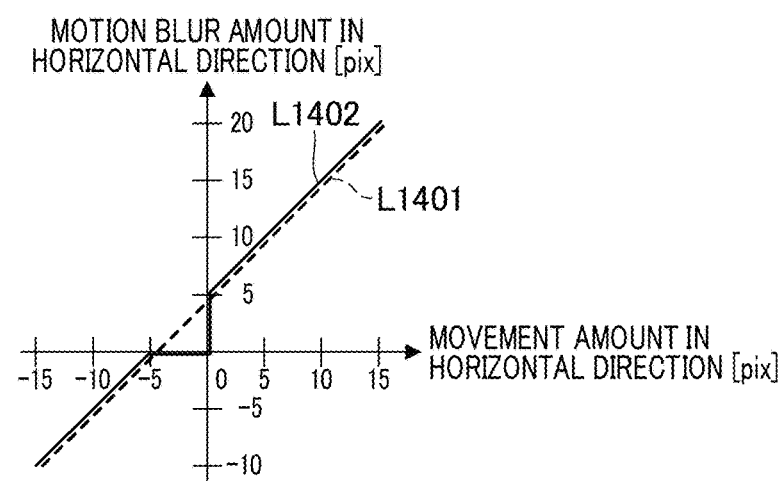
Figure 14C:
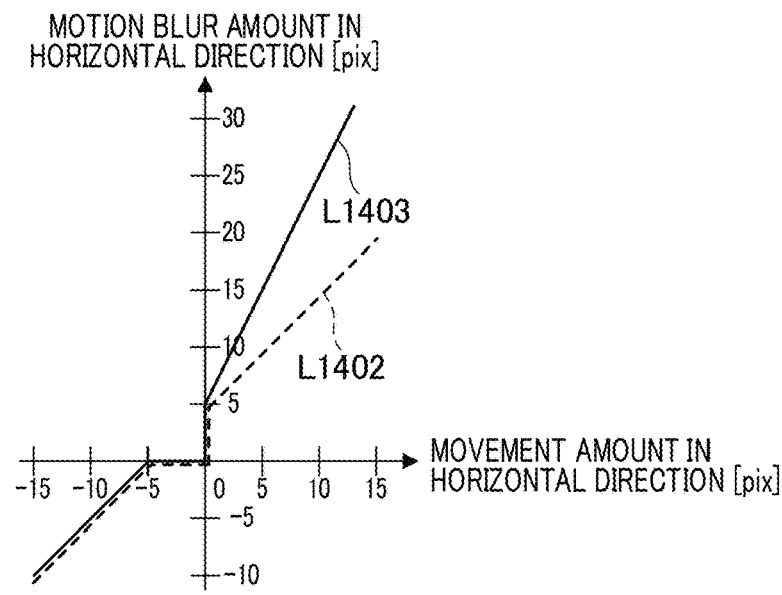

In the motion blur conversion property in FIG. 14A, a broken line L901 indicates a motion blur conversion property when the target motion blur corresponds to 1/60th of a second. The motion blur conversion property L901 is calculated by the motion blur conversion property calculation unit 203 in step S302 of FIG. 3 and the motion blur image generated based on the motion blur conversion property is the image before the motion blur adjustment (correction) in FIG. 13A.

The motion blur conversion property calculation unit 203 calculates a motion blur conversion property L1401 by offsetting the motion blur conversion property L901 based on the standard motion vector (the motion vector L801 in FIG. 8) and the designated motion blur (for example, an instruction to set the motion blur to zero). Specifically, when the direction of the standard motion vector L801 in FIG. 8 is the left in horizontal direction and its length is 5 pixels, the motion blur conversion property L1401 is obtained by offsetting the motion blur conversion property L901 in the left direction by 5 pixels so that the motion blur amount corresponding to the standard motion vector becomes 0.

Subsequently, in step S504 of FIG. 12, the motion blur adding unit 204 adds the motion blur to the captured image based on the motion blur conversion property calculated by the motion blur conversion property calculation unit 203 and the motion vector of each pixel calculated by the motion vector calculation unit 201. The step S504 of FIG. 12 corresponds to the step S504 of FIG. 5.

Subsequently, in step S505 of FIG. 12, the motion blur image generated by the motion blur adding unit 204 in step S504 of FIG. 12 is displayed on the display unit 109. The motion blur image is illustrated in FIG. 13B. In the image after the motion blur adjustment in FIG. 13B, the dog stops and the motion blur of the background is larger than in the image before the motion blur adjustment in FIG. 13A. This is because the dog designated by the user is set as the designated standard region and the motion blur is also added to an image other than the designated standard region in the entire image based on the motion blur conversion property L1401 in which the motion blur amount of the standard motion vector becomes 0 in the designated standard region.

By changing the motion blur conversion property based on the designated motion blur and the standard motion vector of the designated standard region designated by the user in this way, it is possible to preferably correct the motion blur. That is, it is possible to appropriately correct a relation between the motion blurs of the subject and the background. Here, the image other than the designated standard region may be the other image in a whole region or may be an image in a partial region different from the designated standard region.

The motion blur adjustment (correction) in step S304 of FIG. 3 has been described above.

Next, a modification example of the motion blur adjustment (correction) in step S304 of FIG. 3 will be described.

In the modification example, an example of adjustment of a motion blur of a subject that is long in a depth direction when the subject is viewed from the imaging apparatus will be described.

First, a photographing process (step S301 of FIG. 3) according to the modification example will be described with reference to FIG. 15.

Figure 15A:
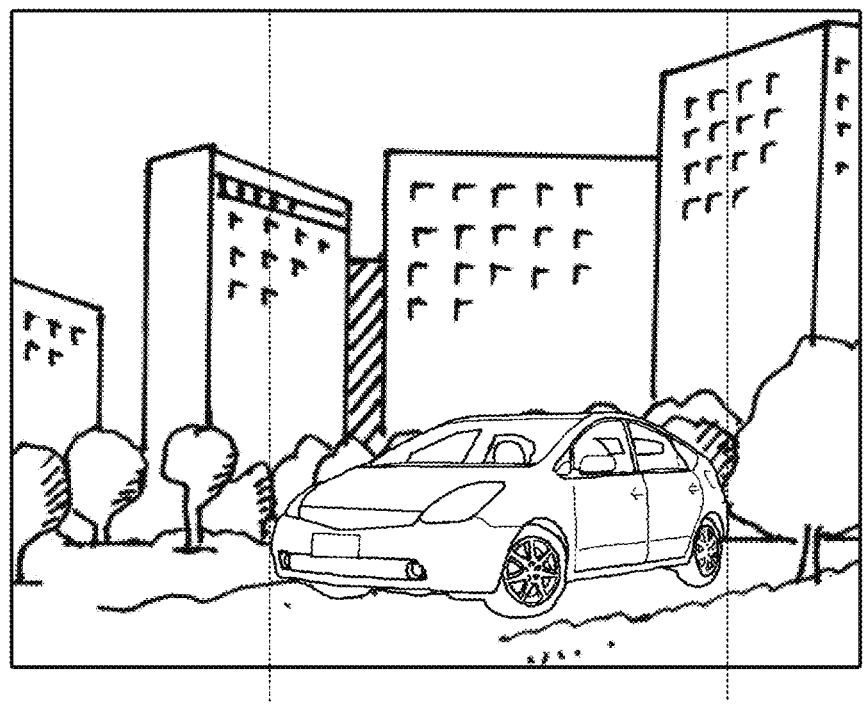
FIGS. 15A and 15B are diagrams illustrating captured images in a car scene.
Figure 15B:
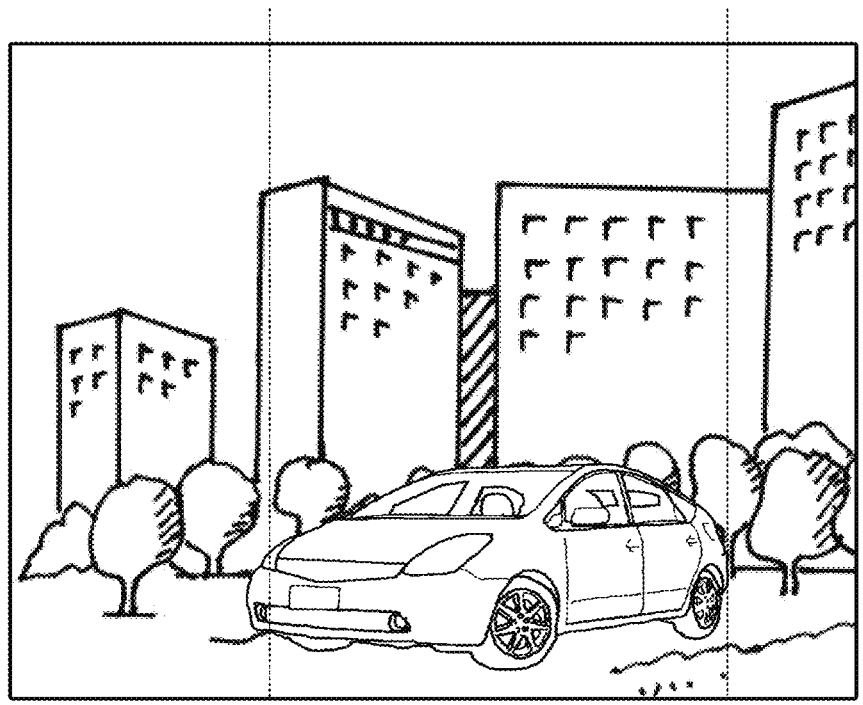

FIGS. 15A and 15B illustrate an example in which a photographer swings the imaging apparatus to follow a running car to execute consecutive shooting while following the running car. FIG. 15A illustrates a captured image of an Nth frame and FIG. 15B illustrates a captured image of an N+1th frame. Here, N is a positive integer. Since the imaging is executed for a short exposure time, a large motion blur does not occur in each of the captured images.

In following-photographing, it is difficult to accurately swing the imaging apparatus while following the running car. In particular, it is very difficult to swing the imaging apparatus when a motion of a subject is fast and its motion is not predictable. In the example of FIGS. 15A and 15B, captured images when the swinging of the imaging apparatus to the running car is delayed are illustrated and the car of the captured image of the N+1th frame may be moved further to the left than the captured image of the Nth frame.

Next, the generation of the motion blur image in step S302 of FIG. 3 will be described with reference to FIGS. 15, 16, and 17.

Figure 16:
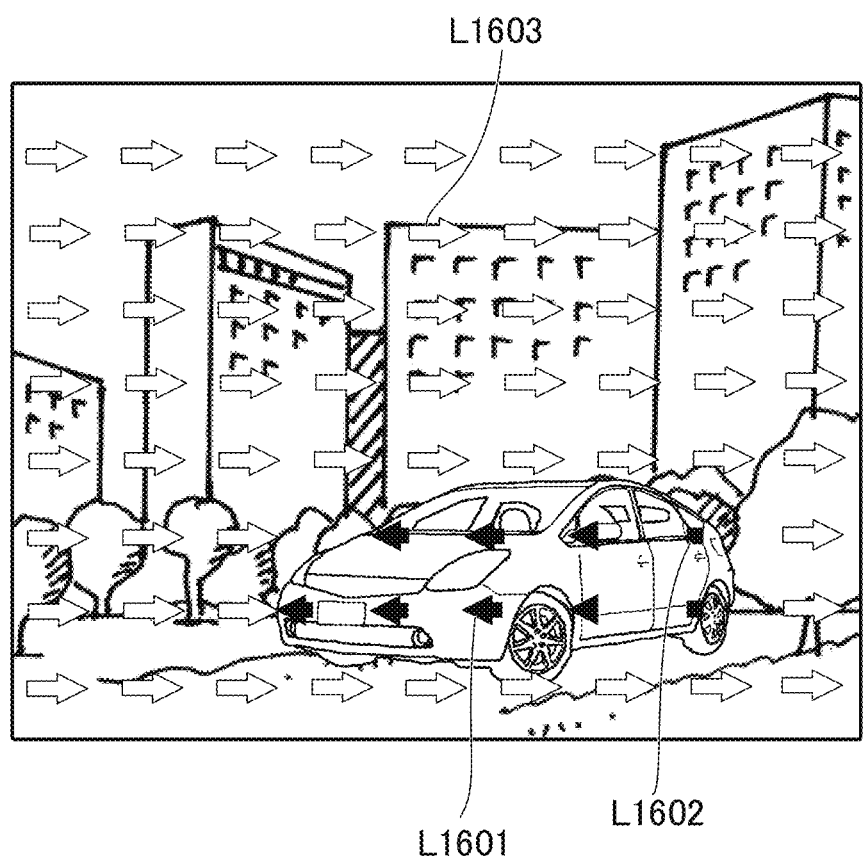
FIG. 16 is a diagram illustrating motion vectors in the car scene.

Motion vectors calculated by the motion vector calculation unit 201 based on the captured images in FIGS. 15A and 15B are illustrated in FIG. 16. FIG. 16 is a diagram illustrating motion vectors when the captured image of the Nth frame in FIG. 15A is set as a standard captured image and the captured image of the N+1th frame in FIG. 15B is set as a reference captured image. In the example of FIG. 16, the motion vector of each pixel is not illustrated and only intermittent representative motion vectors are illustrated for simplification.

In the example of FIG. 16, since following-photographing is executed by swinging the imaging apparatus 100 from the right to the left and following the running car is slightly delayed, motion vectors in the rightward direction are detected with regard to stationary objects of the background and the motion vectors in the leftward direction are detected with regard to the running car. Here, in the case of a subject such as a car that is long in the depth direction when the subject is viewed from the imaging apparatus, a movement amount between the captured images differs in accordance with a distance from the imaging apparatus to the subject. Therefore, the movement amount differs for each region despite the same car. Therefore, in the example of FIG. 16, motion vectors in the leftward direction are detected in a front region of the car and motion vectors are not detected in a rear region of the car.

Figure 17A:
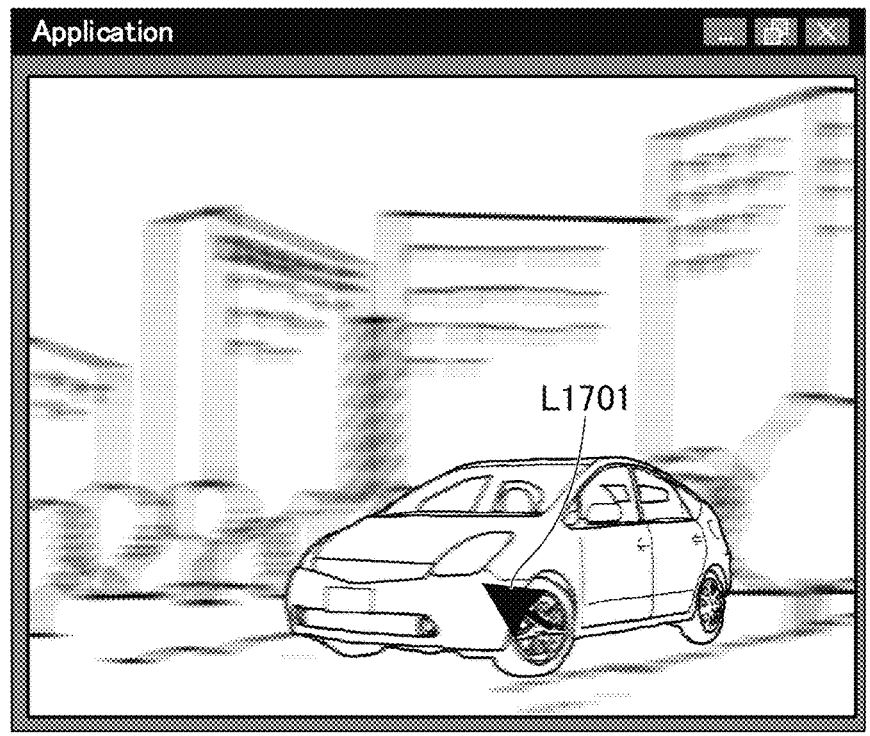
FIGS. 17A and 17B are diagrams illustrating images before and after the motion blur adjustments in the car scene.

A motion blur image obtained by adding the motion blur to the captured images in FIGS. 15A and 15B through the process of generating the motion blur image in step S302 of FIG. 3 is illustrated in FIG. 17A. The image before the motion blur adjustment in FIG. 17A is a motion blur image to which a motion blur corresponding to $\frac{1}{60}$th of a second is added as a target motion blur based on the motion blur conversion property of L901 in FIG. 9 and the motion vectors illustrated in FIG. 16. Here, in the example of the image before the motion blur adjustment in FIG. 17A, the front region of the running car, which is the subject, is blurred as well as the background.

Next, a method of decreasing the motion blur of the entire car and increasing the motion blur of the background in the image before the motion blur adjustment in FIG. 17A through the process of adjusting (correcting) the motion blur in step S304 of FIG. 3 will be described with reference to FIGS. 12, 14, and 17.

First, a method of decreasing the motion blur in the blurred front region of the car in the image before the motion blur adjustment in FIG. 17A will be described.

In steps S1201 and S1202 of FIG. 12, the user executes a single click to designate the blurred front region (front bumper) of the car, as indicated by L1701 of FIG. 17(A), in the image before the motion blur adjustment in FIG. 17A. Based on this designation, the control unit 101 receives the front bumper as a designated standard region and receives the single click operation as a designated motion blur to decrease the motion blur (to zero).

In step S1203 of FIG. 12, the standard motion vector specifying unit 202 specifies (sets) the standard motion vector based on the designated standard region received by the control unit 101 in step S1201 and the motion vectors calculated by the motion vector calculation unit 201. Specifically, a motion vector L1601 in the front region which is the designated standard region in FIG. 16 is specified (set) as a standard motion vector.

In step S1204 of FIG. 12, the motion blur conversion property calculation unit 203 calculates the motion blur conversion property based on the target motion blur, the standard motion vector, and the designated motion blur. A method of calculating the motion blur conversion property will be described with reference to FIGS. 14A to 14C. In the motion blur conversion property in FIG. 14A, a broken line L901 indicates a motion blur conversion property when the target motion blur is corresponding to $\frac{1}{60}$th of a second. The motion blur conversion property L901 is the motion blur conversion property calculated by the motion blur conversion property calculation unit 203 in step S302 of FIG. 3 and the motion blur image generated based on the motion blur conversion property is the image before the motion blur adjustment in FIG. 17A. The motion blur conversion property calculation unit 203 calculates the motion blur conversion property L1401 by offsetting the motion blur conversion property L901 based on the standard motion vector and the designated motion blur.

Specifically, when the direction of the standard motion vector in FIG. 16 is the left in horizontal direction and its length is 5 pixels, the motion blur conversion property L901 is offset in the left direction by 5 pixels so that the motion blur amount corresponding to the standard motion vector becomes 0, so as to obtain the motion blur conversion property L1401. The motion blur amount corresponding to the standard motion vector may not necessarily be 0. For example, a motion blur conversion property in which the motion blur amount corresponding to the motion vector which is substantially the same as the standard motion vector becomes small (for example, 4 pixels are offset) may be acceptable.

In step S504 of FIG. 12, the motion blur adding unit 204 adds the motion blur to the captured image based on the motion blur conversion property calculated by the motion blur conversion property calculation unit 203 and the motion vector of each pixel calculated by the motion vector calculation unit 201. Then, the motion blur image is output to the display unit 109.

In step S505 of FIG. 12, the motion blur image generated by the motion blur adding unit 204 in step S504 of FIG. 12 is displayed on the display unit 109. The motion blur image is illustrated in FIG. 17B.

Figure 17B:
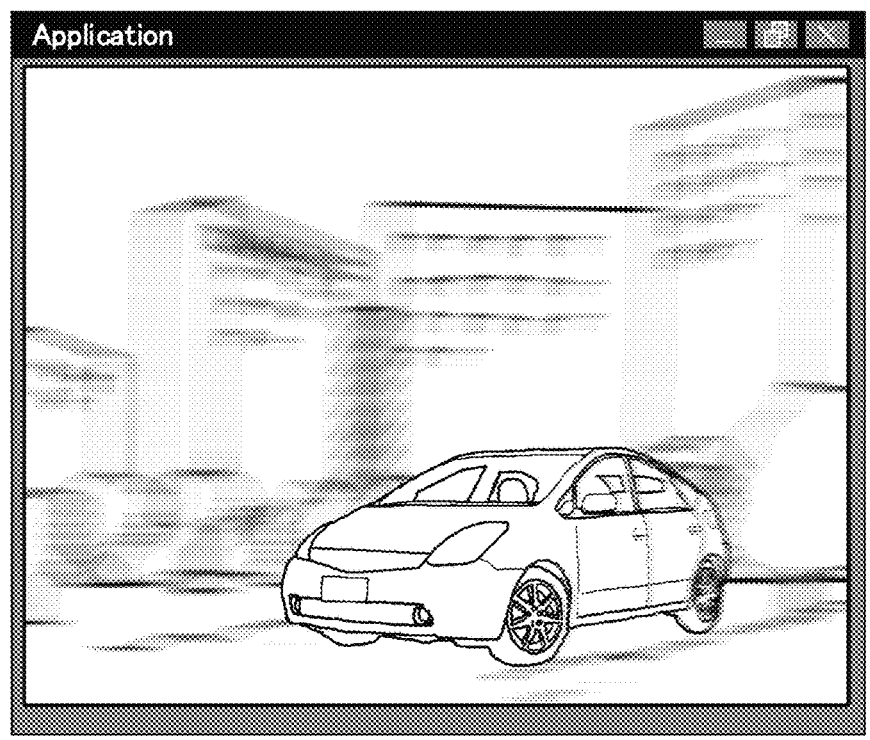

In the image after the motion blur adjustment in FIG. 17B, the front region of the car stops and the rear region of the car is conversely blurred compared to an image before the motion blur adjustment in FIG. 17A. The motion blur of the background is large. This is because the front region of the car designated by the user is set as the designated standard region and the motion blur is added based on the motion blur conversion property L1401 in which the motion blur amount of the standard motion vector in the designated standard region is 0. In this way, in the case of a subject that is long in the depth direction when the subject is viewed from the imaging apparatus, a movement amount between the captured images is changed in accordance with a distance from the imaging apparatus to the subject. Therefore, even when the front region of the car stops, the rear region with a distance difference in depth direction is blurred. Accordingly, since an instruction to complete adjustment in step S305 of FIG. 3 is not given in this state, the process returns to step S304.

Next, a method of reducing a motion blur of the burred rear region of the car in the image after the motion blur adjustment in FIG. 17B will be described with reference to FIGS. 12, 14, and 18. The image before the motion blur adjustment in FIG. 18A is a motion blur image to which a motion blur for which a target motion blur corresponding to $\frac{1}{60}$th of a second is added based on the motion vectors illustrated in FIG. 16 and the motion blur conversion property of L1401 in FIG. 14A as in the image after the motion blur adjustment in FIG. 17B.

Figure 18A:
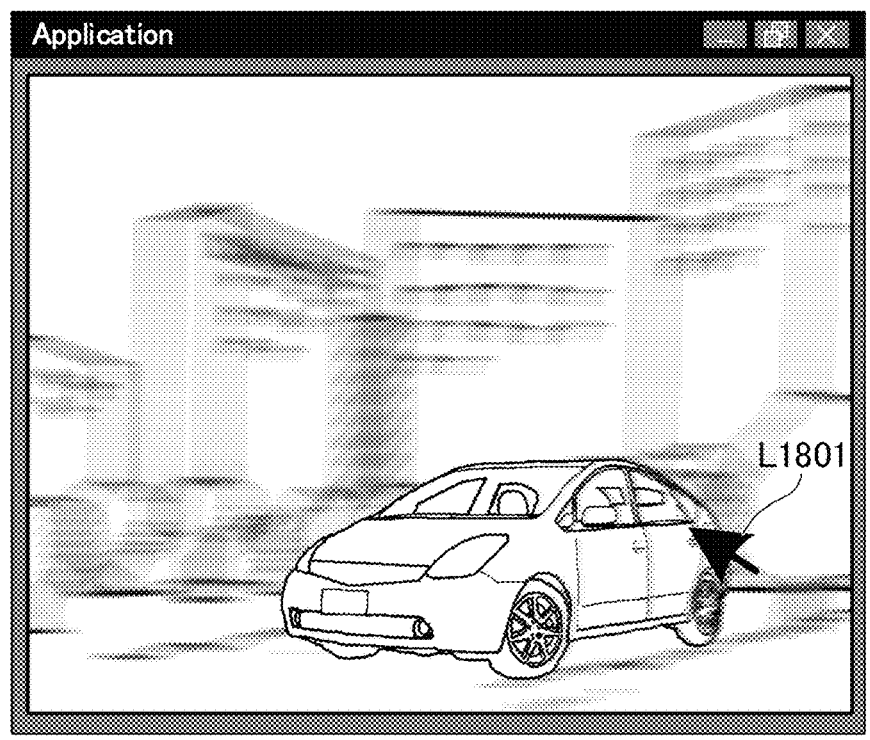
FIGS. 18A and 18B are diagrams illustrating images before and after the motion blur adjustments in the car scene.

In steps S1201 and S1202 of FIG. 12, in an image before motion blur adjustment in FIG. 18A, as indicated by L1801 in FIG. 18A, the user executes a single click to designate the blurred rear region (for example, fuel filler cap) of the car. Based on the designation, the control unit 101 receives the fuel filler cap as a designated standard region and receives the single click operation as a designated motion blur to decrease the motion blur.

In step S1203 of FIG. 12, the standard motion vector specifying unit 202 specifies (sets) the standard motion vector based on the designated standard region received by the control unit 101 in step S1201 and the motion vectors calculated by the motion vector calculation unit 201. Specifically, a motion vector L1602 of the fuel filler cap which is the designated standard region in FIG. 16 is specified (set) as a standard motion vector. Here, the standard motion vector specifying unit 202 specifies (sets) two motion vectors of the motion vector L1601 of the front bumper which is the previously received designated standard region and the motion vector L1602 of the fuel filler cap which is the newly received designated standard region as standard motion vectors.

In step S1204 of FIG. 12, the motion blur conversion property calculation unit 203 recalculates the motion blur conversion property based on the target motion blur, the two standard motion vectors, and the designated motion blur. A method of recalculating the motion blur conversion property will be described with reference to FIGS. 14A to 14C. In the motion blur conversion property in FIG. 14B, the broken line L1401 indicates the same motion blur conversion property as the motion blur conversion property L1401 in FIG. 14A. The motion blur image generated based on the motion blur conversion property L1401 is the image before the motion blur adjustment in FIG. 18A.

The motion blur conversion property calculation unit 203 calculates a motion blur conversion property L1402 by setting the motion blur amount in a predetermined movement amount range in the motion blur conversion property L1401 to 0 so that the motion blur amounts corresponding to the two standard motion vectors are decreased. Specifically, when the direction of the standard motion vector L1601 in FIG. 16 is the left in horizontal direction, its length is 5 pixels, the length of the standard motion vector L1602 is 0 pixels, the motion blur conversion property L1402 is calculated so that the motion blur amount in the range of the horizontal movement amount from −5 to 0 becomes 0.

In step S504 of FIG. 12, the motion blur adding unit 204 adds the motion blur to the captured image based on the motion blur conversion property calculated by the motion blur conversion property calculation unit 203 and the motion vector of each pixel calculated by the motion vector calculation unit 201. Then, the motion blur image is output to the display unit 109.

Next, in step S505 of FIG. 12, the motion blur image generated by the motion blur adding unit 204 in step S504 of FIG. 12 is displayed on the display unit 109. The motion blur image is illustrated in FIG. 18B.

Figure 18B:
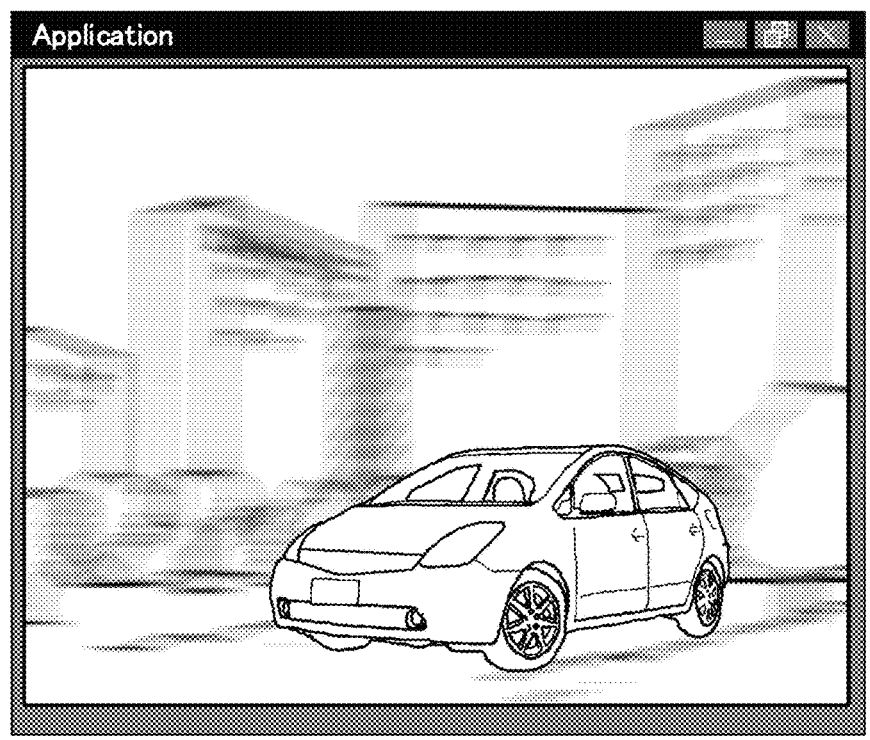

In the image after the motion blur adjustment in FIG. 18B, the front region and the rear region of the car stop and the background is blurred. This is because the front region and the rear region of the car designated by the user are set as the designated standard region and the motion blur is added based on the motion blur conversion property L1402 in which the motion blur amount of the standard motion vector in the designated standard region is 0.

In this way, in the case of a subject that is long in the depth direction when the subject is viewed from the imaging apparatus, a motion blur image in which the entire subject having a distance difference in depth direction stops can be obtained by designating the two designated standard regions and calculating the motion blur conversion property L1402 as in FIG. 14B. That is, a relation between motion blurs of the subject and the background can be appropriately corrected.

Figure 19A:
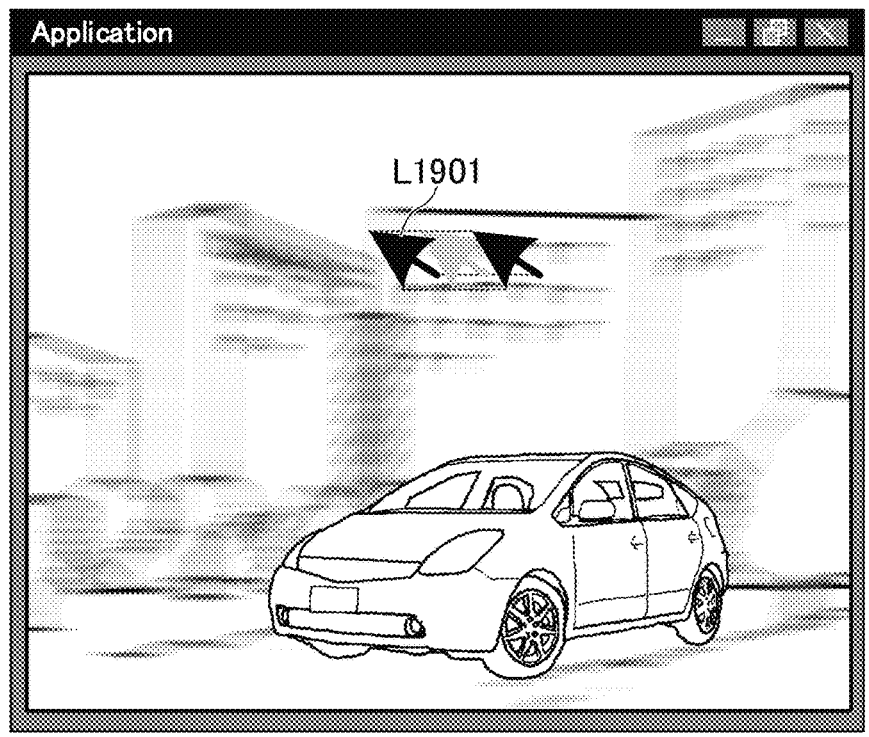
FIGS. 19A and 19B are diagrams illustrating images before and after the motion blur adjustments in the car scene.

Next, a method of correcting a motion blur when the motion blur of the background is desired to be large in the image after motion blur adjustment in FIG. 18B or the like will be described with reference to FIGS. 12, 14, and 19. The image before the motion blur adjustment in FIG. 19A is similar to the image after the motion blur adjustment in FIG. 18B. That is, the image before the motion blur adjustment is an example of a motion blur image to which a motion blur such as a motion blur for which a target motion blur is corresponding to 1/60th of a second is added based on the motion vector illustrated in FIG. 16 and the motion blur conversion property of L1402 in FIG. 14B. However, it is needless to say that the following modification examples can be applied to the image such as shown in FIG. 13B.

For example, when the adjustment of S305 of FIG. 3 is not completed, a case where the motion blur is further adjusted in S304 will be assumed. In steps S1201 and S1202 of FIG. 12, as indicated by L1901 in FIG. 19A, the user desires to further blur a background region (for example, a building) in some cases in the image before motion blur adjustment in FIG. 19A. In these cases, the user designates a motion blur amount by executing dragging by a motion blur amount desired to be blurred through a touch or mouse click of L1901. Based on this designation, the control unit 101 receives a building at drag start coordinates as a designated standard region and receives the length of the drag as a designated motion blur.

In step S1203 of FIG. 12, the standard motion vector specifying unit 202 specifies (sets) the standard motion vector based on the designated standard region received by the control unit 101 in step S1201 and the motion vectors calculated by the motion vector calculation unit 201. Specifically, a motion vector L1603 of a building which is the designated standard region in FIG. 16 is specified (set) as a standard motion vector.

In step S1204 of FIG. 12, the motion blur conversion property calculation unit 203 calculates the motion blur conversion property based on the target motion blur, the standard motion vector, and the designated motion blur. A method of calculating the motion blur conversion property will be described with reference to FIGS. 14A to 14C. For example, when the background in FIG. 19A is designated as a standard region, the motion blur conversion property of FIG. 14C modified using the motion blur conversion property L1402 in FIG. 14B as a base is used. The broken line L1402 indicates the same motion blur conversion property as the motion blur conversion property L1402 in FIG. 14B. The motion blur image generated based on the motion blur conversion property L1402 is the image before motion blur adjustment in FIG. 19A.

In the embodiment, the motion blur conversion property calculation unit 203 receives an instruction by click and drag operations for designating a standard motion vector, as illustrated by L1901 in FIG. 19A. Then, the motion blur conversion property L1403 is obtained by changing a slope of the motion blur conversion property L1402 so that the motion blur amount by the designated standard motion vector becomes the designated motion blur. Specifically, it is assumed that the direction of the standard motion vector L1603 in FIG. 16 is the right in horizontal direction, its length is 10 pixels, and the designated motion blur indicated by L1901 in FIG. 19A is 25 pixels in the right in horizontal direction. Then, the motion blur conversion property L1403 is calculated so that the motion blur amount of 10 pixels to the right in the horizontal movement amount becomes 25 pixels.

When the background is designated as a standard region in the image in FIG. 13B and the motion blur amount is also designated, the slope of the motion blur conversion property may be changed using L1401 of FIG. 14A as a base.

In step S504 of FIG. 12, the motion blur adding unit 204 adds the motion blur to the captured image based on the motion blur conversion property calculated by the motion blur conversion property calculation unit 203 and the motion vector of each pixel calculated by the motion vector calculation unit 201.

Then, the motion blur image is output to the display unit 109.

In step S505 of FIG. 12, the motion blur image generated by the motion blur adding unit 204 in step S504 of FIG. 12 is displayed on the display unit 109. The motion blur image is illustrated in FIG. 19B.

Figure 19B:
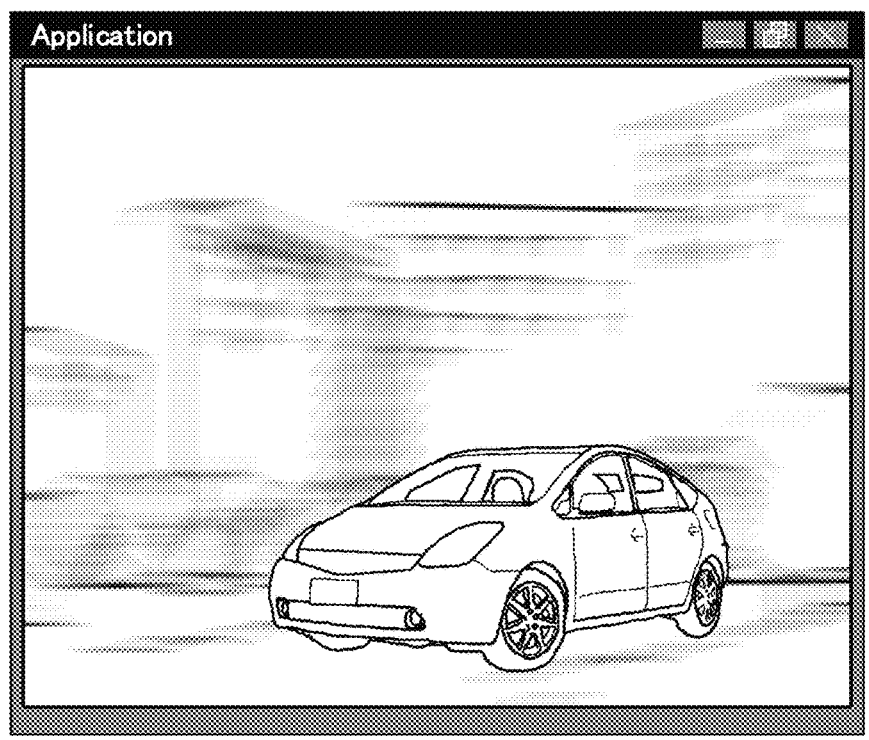

In the image after the motion blur adjustment in FIG. 19B, the motion blur of the background is larger than in the image before the motion blur adjustment in FIG. 19A. This is because the building designated by the user is set as a designated standard region and the motion blur is added based on the motion blur conversion property L1403 in which the motion blur amount of the standard motion vector in the designated standard region is corrected to the dragged length (the designated motion blur). The user can arbitrarily adjust the motion blur by designating the position, the length, and direction in this way. That is, it is possible to appropriately correct the relation between the motion blurs of the subject and the background.

In the first embodiment, the example in which the motion blur is controlled by capturing a plurality of images having a small motion blur and adding a motion blur has been described. However, a method of controlling a motion blur is not limited thereto. For example, a motion blur may be controlled by capturing long exposure images having a large motion blur and reducing the motion blur. The description of a method of reducing a motion blur will be omitted since, for example, a known technology such as a blind deconvolution technique can be used.

In addition, the blind deconvolution technique is a technique for reducing a motion blur by analyzing a motion blur property in an image and convoluting an inverse property to the motion blur property on the image.

In the first embodiment, the example in which a designated motion blur amount is received as a designated motion blur has been described. However, information received as the designated motion blur is not limited thereto. For example, a designation of a motion blur direction may be received as the designated motion blur. In this case, the motion blur conversion property calculation unit 203 calculates a property in which a direction of a motion blur corresponding to a standard motion vector is converted into a direction of a designated motion blur. Thus, it is possible to adjust the direction of the motion blur.

Second Embodiment

Next, a second embodiment will be described. The second embodiment is an example in which a motion blur of an image is corrected based on a standard motion vector determined in accordance with a distribution state of motion vectors. Hereinafter, the second embodiment will be described.

The second embodiment is different from the first embodiment in a configuration and an operation of the motion blur image generation unit 200 in FIG. 2 of the first embodiment. The same reference numerals as those of the first embodiment are given to units that execute the same operations and processes as those of the first embodiment and the description thereof will be omitted.

An operation and a process of the imaging apparatus 100 according to the second embodiment are the same as those of the first embodiment, and thus the description thereof will be omitted.

Next, a configuration example of a motion blur image generation unit 2000 which is characteristics of the second embodiment will be described with reference to FIG. 20. The motion blur image generation unit 2000 according to the second embodiment adds a motion blur to image data recorded on the recording unit 108 to generate a motion blur image.

Figure 20:
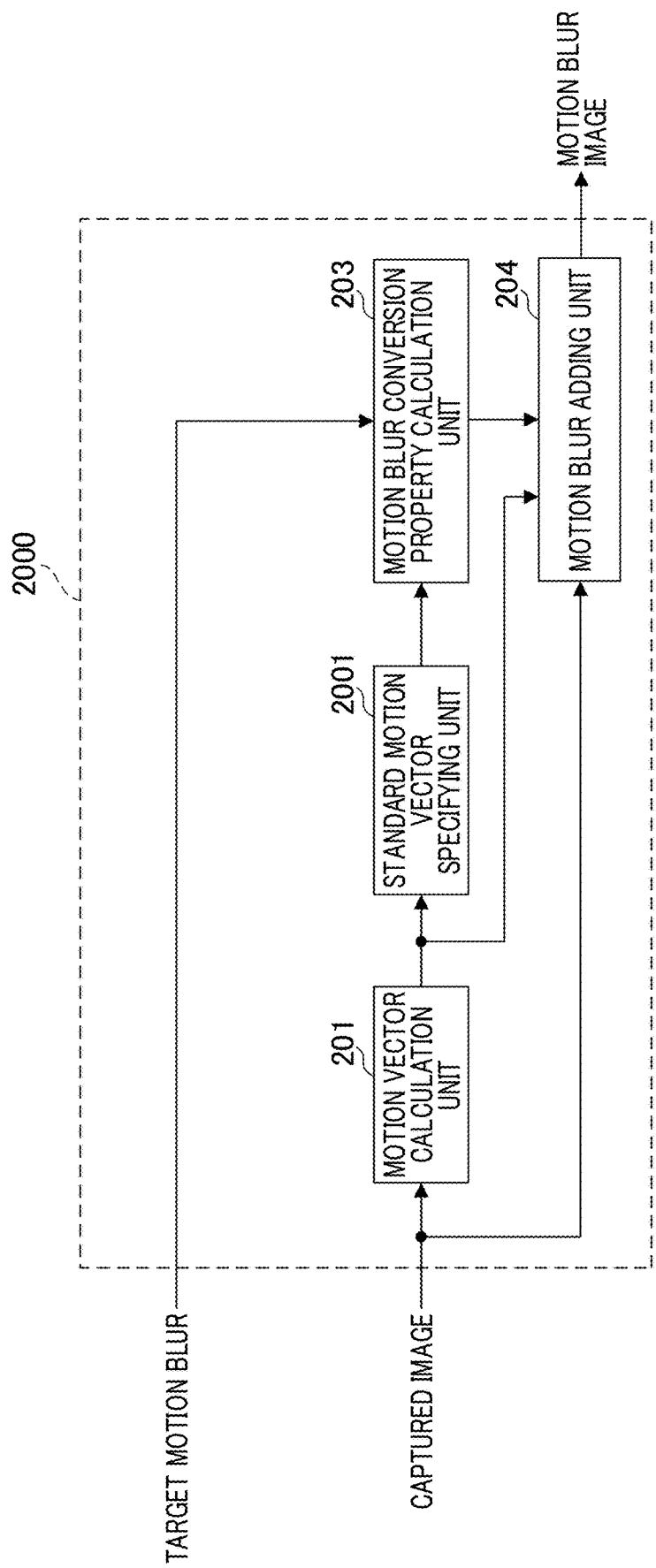
FIG. 20 is a diagram illustrating a configuration example of a motion blur image generation unit 2000 according to a second embodiment.

FIG. 20 is a diagram illustrating a configuration example of the motion blur image generation unit 2000. The motion blur image generation unit 2000 includes the motion vector calculation unit 201, a standard motion vector specifying unit 2001, the motion blur conversion property calculation unit 203, and the motion blur adding unit 204.

The motion blur image generation unit 2000 according to the second embodiment is different from the standard motion vector specifying unit 202 according to the first embodiment in an operation of the standard motion vector specifying unit 2001. The motion vector calculation unit 201, the motion blur conversion property calculation unit 203, and the motion blur adding unit 204 execute operations and processes similar to those of the first embodiment, and thus the description thereof will be omitted.

Next, a process of the motion blur image generation unit 2000 will be described with reference to the flowchart of FIG. 21.

Figure 21:
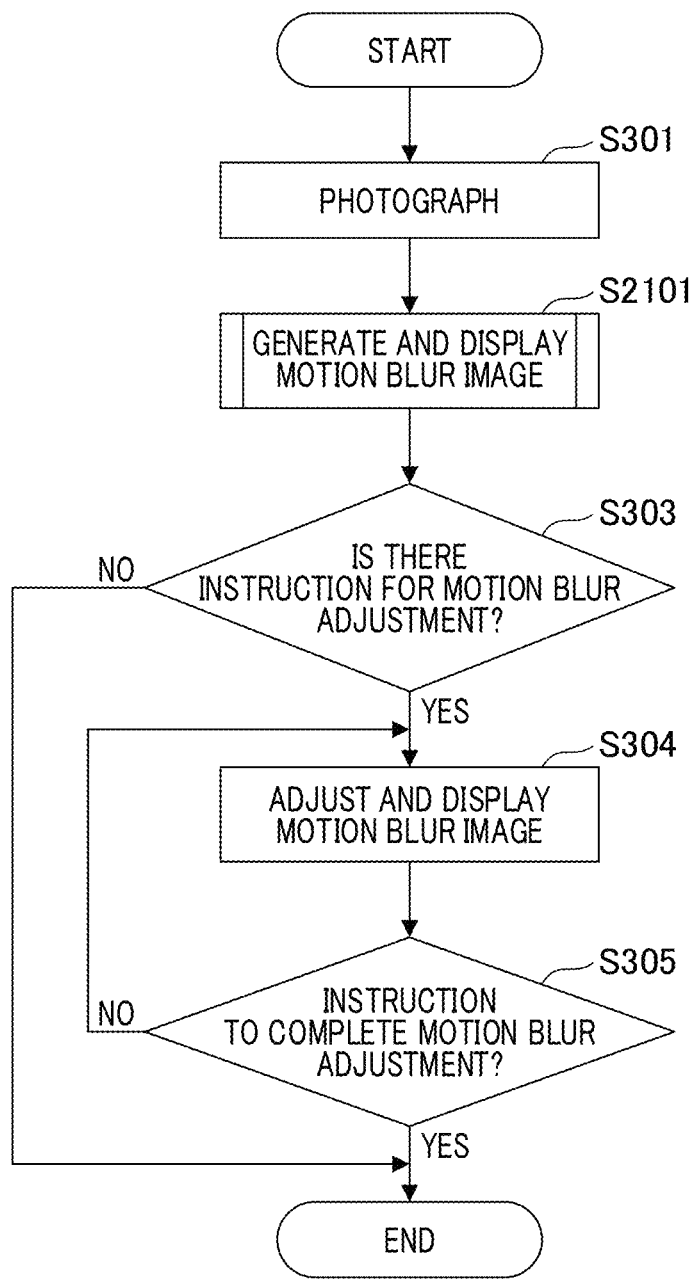
FIG. 21 is a diagram illustrating a process flow of the motion blur image generation unit 2000 according to the second embodiment.

In step S301 of FIG. 21, the control unit 101 determines an exposure time when the imaging unit 105 executes an imaging (photographing) operation. Then, the imaging unit 105 captures a plurality of images based on the determined exposure time and records the plurality of captured images on the recording unit 108. In the embodiment, an example in which 60 images are captured per second as imaging frame rate will be described. That is, the imaging unit 105 captures one image every 1/60th of a second. The captured images are assumed to be, for example, the images in FIGS. 4A and 4B.

In step S2101 of FIG. 21, the motion blur image generation unit 2000 controls a motion blur of the captured image of the Nth frame captured in step S301 of FIG. 21, generates a motion blur image, and outputs the motion blur image to the display unit 109 for display. The details of the motion blur image generation process of step S2101 will be described below.

In step S303 of FIG. 21, it is determined whether an instruction for motion blur adjustment is given from the user within a predetermined time after the motion blur image is displayed in S2101. When the instruction for the motion blur adjustment is not given within the predetermined time in step S303 of FIG. 21, the process ends. In the case of Yes in step S303 of FIG. 21, the process proceeds to step S304 of FIG. 21. The motion blur image generation unit 2000 adjusts (corrects) a motion blur based on the received instruction related to the motion blur from the user and outputs the corrected motion blur image to the display unit 109 for display. A method of adjusting (correcting) the motion blur in step S304 of FIG. 21 is similar to that of the first embodiment, and thus the description thereof will be omitted.

When the user checks the corrected motion blur image displayed on the display unit 109 in step S304 of FIG. 21 and gives an instruction to complete the motion blur adjustment via the instruction input unit 110, it is determined in step S305 of FIG. 21 whether the motion blur adjustment is completed. When the instruction to complete the motion blur adjustment is received in step S305 of FIG. 21, the process ends. When the instruction to complete the motion blur adjustment is not received in step S305 of FIG. 21, the process returns to step S304 of FIG. 21 and the motion blur adjustment (correction) is repeated.

Next, the details of the process of automatically adding the motion blur in step S2101 of FIG. 21 will be described with reference to the flowchart of FIG. 22.

Figure 22:
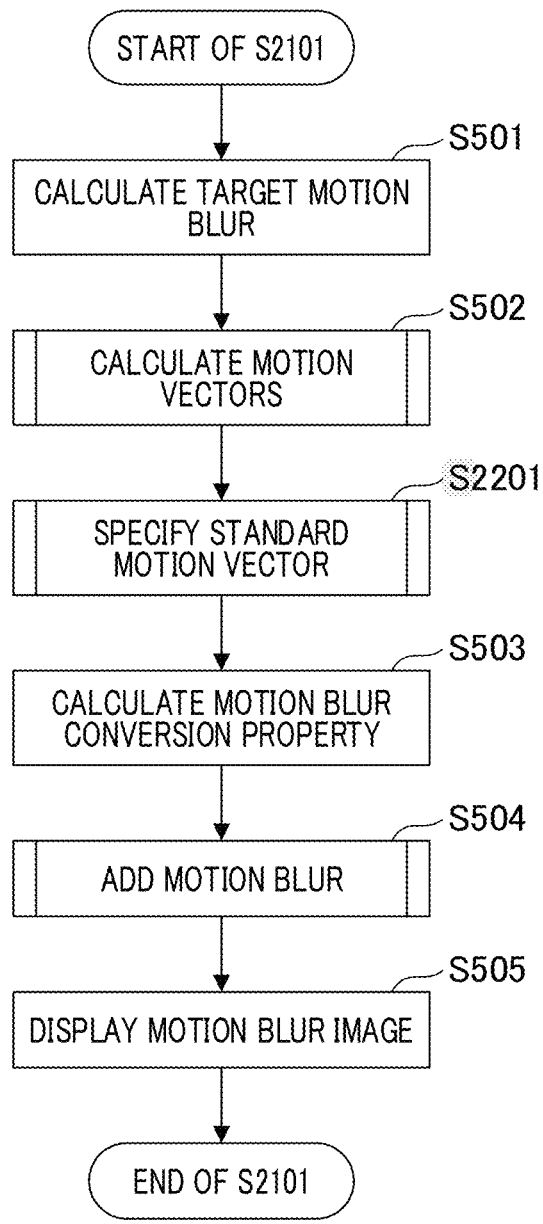
FIG. 22 is a diagram illustrating a flow of a process of generating a motion blur image in step S2101.

In FIG. 22, the steps of the same reference numerals as those of FIG. 5, similar operations to the steps of FIG. 5 are executed.

In step S501 of FIG. 22, the control unit 101 calculates a target motion blur. In the embodiment, the target motion blur is set to a motion blur corresponding to ⅙₀th of a second.

In step S502 of FIG. 22, the motion vector calculation unit 201 calculates, for example, motion vectors between a plurality of captured images recorded on the recording unit 108 and outputs the motion vectors to the standard motion vector specifying unit 2001 and the motion blur adding unit 204. Examples of the calculated motion vectors are the motion vectors illustrated in FIG. 8.

Figure 23:
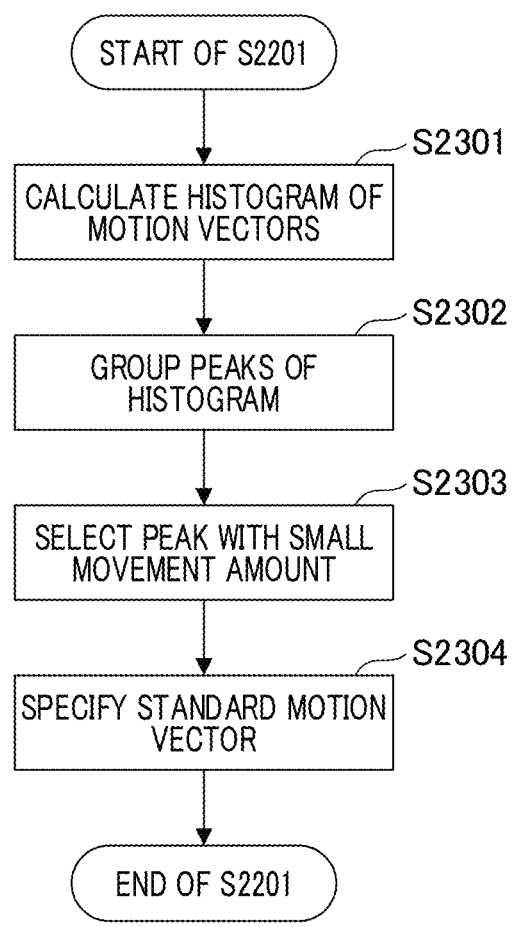
FIG. 23 is a diagram illustrating a flow of a process of specifying a standard motion vector.

In step S2201 of FIG. 22, the standard motion vector specifying unit 2001 specifies (sets) the standard motion vector based on the motion vectors calculated in step S502 of FIG. 22. A method of specifying the standard motion vector will be described with reference to FIG. 23. FIG. 23 is a flowchart illustrating a process of specifying (setting) the standard motion vector based on the motion vectors.

In step S2301 of FIG. 23, the standard motion vector specifying unit 2001 calculates a histogram (frequency distribution) of the motion vectors calculated by the motion vector calculation unit 201 in step S502 of FIG. 22. Specifically, the standard motion vector specifying unit 2001 calculates a histogram of the motion vectors as in FIG. 24 based on the motion vectors as in FIG. 8. The motion vector consists of a movement amount and a 2-dimensional direction determined by motion vector components in the horizontal direction and the vertical direction. In the embodiment, to facilitate the description, a histogram of the movement amounts of the motion vectors in the horizontal direction is indicated. The description of a method of specifying the standard motion vector using the motion vector consisting of the movement amount and the 2-dimensional direction will be omitted since the processes are similar to that shown in FIG. 23.

Figure 24:
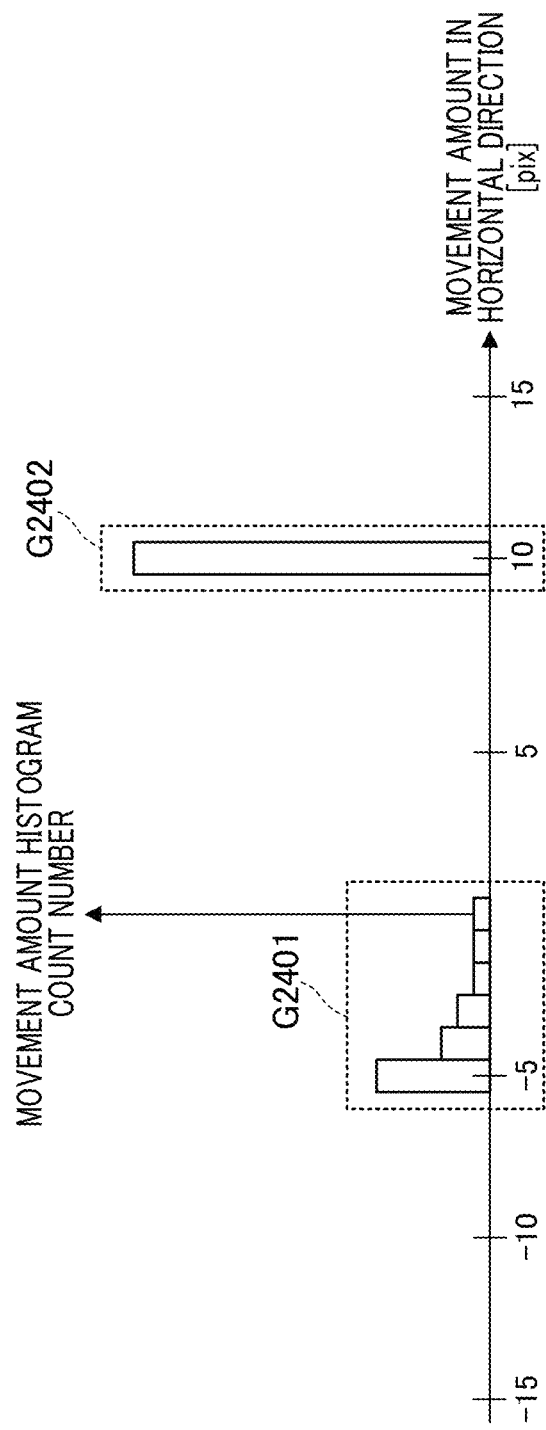
FIG. 24 is a diagram illustrating a histogram of motion vectors.

In step S2302 of FIG. 23, the standard motion vector specifying unit 2001 executes grouping of peaks in the histogram based on the histogram of the motion vectors calculated in step S2301. As the method of grouping the peaks of the histogram, for example, a known method such as an "Otsu threshold process" (Otsu Method) may be used, and the description thereof will be omitted. In the example of FIG. 24, the peaks are classified into group G2401 and group G2402.

In step S2303 of FIG. 23, the standard motion vector specifying unit 2001 selects a group with the smallest movement amount between the groups of the peaks of the histogram. In the example of FIG. 24, group G2401 is selected. Specifically, when the motion vectors with different movement amounts or different directions belong to each group, a movement amount with the largest count number in each group is set as a representative of each group and a group with the smallest movement amount among the representatives of each group is selected.

In step S2304 of FIG. 23, the standard motion vector specifying unit 2001 specifies (sets) the standard motion vector based on the motion vectors belonging to the group of the peaks of the histogram selected in step S2303. When the motion vectors with different movement amounts or directions belong to the selected group, a motion vector with the largest count number in the selected group is specified (set) as a standard motion vector. In the example of FIG. 24, a motion vector of which a movement amount in group G2401 is −5 is specified (set) as the standard motion vector.

The method of specifying the standard motion vector in step S2201 of FIG. 22 has been described above.

Referring back to FIG. 22, in step S503, the motion blur conversion property calculation unit 203 calculates a motion blur conversion property based on the target motion blur and the standard motion vector. Specifically, through a process similar to the process of step S1204 of FIG. 12, the motion blur conversion property L901 illustrated in FIG. 14A is offset by 5 pixels in the left direction so that the motion blur amount corresponding to the standard motion vector becomes 0, and the motion blur conversion property L1401 is obtained.

Subsequently, in step S504 of FIG. 22, the motion blur adding unit 204 adds the motion blur to the captured image based on the motion blur conversion property calculated by the motion blur conversion property calculation unit 203 and the motion vector of each pixel calculated by the motion vector calculation unit 201. Then, the motion blur image is output to the display unit 109.

Subsequently, in step S505 of FIG. 5, the motion blur image generated by the motion blur adding unit 204 in step S504 of FIG. 5 is displayed on the display unit 109.

The process of generating the motion blur image in step S2101 of FIG. 21 has been described above.

In the second embodiment, the example in which the standard motion vector specifying unit 2001 selects the group with the smallest movement amount among the groups of the peaks of the histogram and specifies (sets) the standard motion vector has been described, but a method of specifying the standard motion vector is not limited thereto. For example, the standard motion vector may be specified (set) using both of the movement amounts of two groups, a group with the smallest movement amount and a group of the next smallest movement amount. The motion blur conversion property calculation unit 203 calculates the motion blur conversion property so that the motion blur amount corresponding to the two standard motion vectors selected in this way becomes 0. Thus, it is possible to reduce the motion blurs of two subjects with different movement amounts.

In the second embodiment, the example in which the standard motion vector specifying unit 2001 specifies (sets) one standard motion vector among the plurality of motion vectors and calculates the motion blur conversion property when the plurality of motion vectors with the different movement amounts or directions belong to the group has been described. However, a method of calculating the motion blur conversion property is not limited thereto. For example, all the motion vectors in group G2401 in FIG. 24 may be specified (set) as standard motion vectors and the motion blur conversion property may be calculated so that the motion blur amounts corresponding to all the standard motion vectors become 0. Thus, it is possible to stop the entire subject with different motion vectors in the same subject (for example, a subject that is long in the depth direction) such as the running car in FIG. 16.

In the second embodiment, the example in which the standard motion vector specifying unit 2001 specifies (sets) the standard motion vector based on the histogram of the motion vectors has been described, but a method of specifying the standard motion vector is not limited thereto. For example, a motion vector of a focal region in which the imaging apparatus 100 focuses a focus position may be automatically specified (set) as a standard motion vector.

The preferred embodiments of the present invention have been described above, but the present invention is not limited to the embodiments and can be modified and changed in various forms within the scope of the gist of the present invention.

For example, in the embodiment, a plurality of images read out from a recording unit detachable mounted on the imaging apparatus are acquired and the motion blur image is formed in the imaging apparatus using the plurality of images, as described above. However, the recording unit may not be able to be detachably mounted or may be an external recording unit provided in a cloud or the like. The foregoing recording unit may be connected to an external information processing apparatus rather than an imaging apparatus and a motion blur image may be formed in an information processing apparatus using images read from the recording unit.

In the embodiment, the motion blur is automatically generated based on the plurality of images and the motion blur is added to one image, but the blur may be added using only one image. That is, it is needless to say that, for example, a motion blur in a predetermined direction or with a predetermined amount may be added to a region designated by a user in the one image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims the benefit of Japanese Patent Application No. 2018-172518 filed on Sep. 14, 2018, which is hereby incorporated by reference herein in its entirety.

What is claimed is:

1. An apparatus, comprising:
a controller having a processor which executes instructions stored in a memory or having circuitry, the controller being configured to:
generate a first image based on a plurality of captured images;
receive a designation of a partial region as a standard region manually designated by a user; and
generate a second image based on the standard region and the plurality of captured images, after receiving the designation of the partial region,
wherein the controller is configured to set a predetermined motion blur in the standard region in the second image, to calculate a motion blur adding information according to the predetermined motion blur, and to add the motion blur adding information in other areas in the second image excluding the standard region.

2. The apparatus according to claim 1, wherein the controller is configured to receive the designation of the partial region by a UI.

3. The apparatus according to claim 1, wherein the controller is configured to receive the designation of the partial region by the user through a touch or mouse click operation.

4. The apparatus according to claim 1, wherein blur in the standard region is zero in the second image.

5. The apparatus according to claim 1, wherein blur in the standard region in the second image is made less than blur in the other areas of the second image excluding the standard region.

6. The apparatus according to claim 1, wherein the controller is configured to detect a motion vector of the plurality of captured images, and generate the first image based on the motion vector.

7. The apparatus according to claim 6, wherein the controller is configured to receive the designation of the predetermined motion blur by the user, and generate the second image based on the predetermined motion blur and the motion vector.

8. The apparatus according to claim 7, wherein the controller is configured to receive a designation of an amount and a direction of the predetermined motion blur manually designated by a user.

9. The apparatus according to claim 1, wherein the controller is further configured to:
calculate the motion blur adding information by offsetting a motion blur conversion property based on the predetermined motion blur; and
add the motion blur adding information to each pixel when generating the second image.

10. The apparatus according to claim 1, wherein blur in the standard region in the second image is made less than in the first image and blur in other areas in the second image excluding the standard region is made more than in the first image.

11. An apparatus, comprising:
an image sensor configured to capture a plurality of captured images, and
a controller having a processor which executes instructions stored in a memory or having circuitry, the controller being configured to:
generate a first image based on a plurality of captured images;
receive a designation of a partial region as a standard region manually designated by a user; and
generate a second image based on the standard region and the plurality of captured images, after receiving the designation of the partial region,
wherein the controller is configured to set a predetermined motion blur in the standard region in the second image, to calculate a motion blur adding information according to the predetermined motion blur, and to add the motion blur adding information in other areas in the second image excluding the standard region.

12. An image processing method for generating an image, comprising:
generating a first image based on a plurality of captured images;
receiving a designation of a partial region as a standard region manually designated by a user; and
generating a second image based on the standard region and the plurality of captured images, after receiving the designation of the partial region,
wherein the image processing method further comprises setting a predetermined motion blur in the standard region in the second image, calculating a motion blur adding information according to the predetermined motion blur, and adding the motion blur adding information in other areas in the second image excluding the standard region.

13. A non-transitory computer readable medium storing a program causing a computer to execute image process for generating an image, the image process comprising
- generating a first image based on a plurality of captured images;
- receiving a designation of a partial region as a standard region manually designated by a user; and
- generating a second image based on the standard region and the plurality of captured images, after receiving the designation of the partial region,
- wherein the image process further comprises setting a predetermined motion blur in the standard region in the second image, calculating a motion blur adding information according to the predetermined motion blur, and adding the motion blur adding information in other areas in the second image excluding the standard region.

* * * * *